(12) United States Patent
Liao

(10) Patent No.: US 12,287,863 B2
(45) Date of Patent: Apr. 29, 2025

(54) VEHICLE-MOUNTED DEVICE CONTROL METHOD, VEHICLE-MOUNTED DEVICE, AND VEHICLE SYSTEM

(71) Applicant: Huawei Technologies Co., Ltd., Shenzhen (CN)

(72) Inventor: Zuopeng Liao, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 249 days.

(21) Appl. No.: 18/043,229

(22) PCT Filed: Aug. 10, 2021

(86) PCT No.: PCT/CN2021/111911
§ 371 (c)(1),
(2) Date: Feb. 27, 2023

(87) PCT Pub. No.: WO2022/042298
PCT Pub. Date: Mar. 3, 2022

(65) Prior Publication Data
US 2024/0028692 A1    Jan. 25, 2024

(30) Foreign Application Priority Data
Aug. 31, 2020  (CN) .......................... 202010901662.1

(51) Int. Cl.
*G06F 21/44* (2013.01)
*B60R 16/023* (2006.01)

(52) U.S. Cl.
CPC .......... *G06F 21/44* (2013.01); *B60R 16/0231* (2013.01)

(58) Field of Classification Search
CPC ...... G06F 21/44; G06F 21/629; G06F 21/575; G06F 21/33; G06F 21/71; B60R 16/0231; H04L 2209/84; H04L 9/3247; H04L 9/3265; H04L 63/0823; H04L 63/0869; H04L 63/108; H04L 67/12; H04W 4/48; H04W 12/069
See application file for complete search history.

(56) References Cited

U.S. PATENT DOCUMENTS

| 7,269,726 | B1 * | 9/2007 | Corella | ................... | H04L 9/006 |
| | | | | | 726/18 |
| 11,178,158 | B2 * | 11/2021 | Buffard | ................. | H04L 9/3297 |
| 2017/0111177 | A1 | 4/2017 | Oguma et al. | | |
| 2018/0183773 | A1 * | 6/2018 | Nakagawa | .......... | H04L 63/0428 |

(Continued)

FOREIGN PATENT DOCUMENTS

| CN | 106603483 A | 4/2017 |
| CN | 107040379 A | 8/2017 |

(Continued)

*Primary Examiner* — John B King
(74) *Attorney, Agent, or Firm* — Conley Rose, P.C.

(57) ABSTRACT

A vehicle-mounted device control method includes a digital certificate to perform security authentication between electronic control units (ECUs), and a function that is currently allowed to be accessed is determined based on a matching degree of certificate chains. The method comprises transmitting the digital certificate and an encrypted instruction between the ECUs, determining accessible functions based on the matching degree of certificate chains, and either starting, or failing to start, a function based on permission to access the function.

20 Claims, 12 Drawing Sheets

(56) References Cited

U.S. PATENT DOCUMENTS

2020/0177398 A1\* 6/2020 Takemori ............ H04L 63/0823
2024/0028692 A1  1/2024 Liao

FOREIGN PATENT DOCUMENTS

| | | | | |
|---|---|---|---|---|
| CN | 112131572 A | \* | 12/2020 | ......... B60R 16/0231 |
| EP | 4195078 A1 | \* | 6/2023 | ......... B60R 16/0231 |
| JP | 7109569 B2 | \* | 7/2022 | ......... H04L 63/0823 |
| WO | WO-2019145488 A1 | \* | 8/2019 | ............. G06F 21/57 |

\* cited by examiner

User interface 80

User interface 80

VEHICLE-MOUNTED DEVICE CONTROL METHOD, VEHICLE-MOUNTED DEVICE, AND VEHICLE SYSTEM

CROSS-REFERENCE TO RELATED APPLICATIONS

This is a National Stage of International Patent Application No. PCT/CN2021/111911 filed on Aug. 10, 2021, which claims priority to Chinese Patent Application No. 202010901662.1 filed on Aug. 31, 2020. Both of the aforementioned applications are hereby incorporated by reference in their entireties.

TECHNICAL FIELD

Embodiments of this application relate to the communications field and the information security field, and in particular, to a vehicle-mounted device control method, a vehicle-mounted device, and a vehicle system.

BACKGROUND

Currently, as a quantity of electronic control units (electronic control units, ECUs) installed in a vehicle system increases, problems such as invalid replacement of the ECU, invalid intrusion of an ECU program, and malicious tampering of ECU key data are prone to occur.

To resolve the foregoing problems, the vehicle system uses a symmetric key technology to implement security authentication between the ECUs. In the vehicle system, a same symmetric key is stored in two ECUs. When a vehicle runs, one ECU sends a random number to the other ECU through a controller area network (controller area network, CAN) bus. The other ECU encrypts the random number by using the stored symmetric key, to obtain a return value, and sends the return value to the ECU. The ECU decrypts the return value by using the stored symmetric key corresponding to the other ECU, and compares a decryption result with the random number. If the decryption result and the random number are consistent, the ECU determines that the other ECU is valid. If the decryption result and the random number are different, the ECU determines that the other ECU is invalid and stops working.

During vehicle production and use, the symmetric key is vulnerable to malicious leakage or unauthorized tampering. As a result, a security level of the vehicle system is low.

SUMMARY

This application provides a vehicle-mounted device control method, a vehicle-mounted device, and a vehicle system, to improve a security level of the vehicle system.

According to a first aspect, this application provides a vehicle-mounted device control method. The method is applied to a vehicle system including a first ECU and a second ECU, the first ECU stores a first digital certificate and a first private key, and the second ECU stores a second digital certificate. The method may include: The first ECU sends the first digital certificate to the second ECU, where the first digital certificate includes a first public key; the first ECU sends, to the second ECU, a first instruction encrypted by using the first private key, where the first instruction is used to instruct the second ECU to start a first function; the second ECU decrypts the encrypted first instruction by using the first public key; the second ECU determines, based on a quantity of same CAs included in a first certificate authority CA and a second CA, a function that is allowed to be accessed by the second ECU, where the first CA is a CA issuing the first digital certificate, the second CA is a CA issuing the second digital certificate, there are a plurality of first CAs and a plurality of second CAs, a larger quantity of same CAs included in the first CA and the second CA indicates a larger quantity of functions that are allowed to be accessed by the second ECU; and if the function that is allowed to be accessed by the second ECU includes the first function, the second ECU starts the first function, or if the function that is allowed to be accessed by the second ECU does not include the first function, the second ECU refuses to start the first function.

According to the method in the first aspect, a digital certificate is used to perform security authentication between ECUs, so that a security level of the vehicle system can be improved. In addition, the method does not need to distinguish between a main ECU and a key ECU. This reduces a requirement for storage space. In addition, certificate chain matching degrees are different in a security method between the ECUs, and functions that can be accessed by an ECU 2 are different. According to this method, ECU resource waste caused by unity of an authentication result in the conventional technology is avoided, costs and resources are saved, and user experience is improved. In addition, after an ECU in the vehicle system is replaced into another vehicle system, the ECU may further restrict some functions and continue to run. In this way, the ECU can be appropriately reused, the costs and the resources can be saved, and user experience can be improved.

With reference to the first aspect, in some implementations, after receiving a first message from an electronic device, the first ECU may send the first digital certificate to the second ECU in response to the first message. The first message is used to indicate the second ECU to start the first function.

For example, when the first ECU is an ECU of a vehicle-mounted T-box, the electronic device such as a mobile phone may send a remote control instruction to a server in response to a user operation, and the server forwards the remote control instruction to the first ECU. The remote control message received by the first ECU is the first message. Herein, the server is configured to provide a remote vehicle control service.

With reference to the first aspect, in some implementations, after starting the first function or refusing to start the first function, the second ECU may further send a result of starting the first function to the first ECU; and the first ECU sends a second message to the electronic device, where the second message is used to indicate the result of starting the first function by the second ECU. In this way, the electronic device may output prompt information of the result, so that the user learns of the result of starting the first function by the second ECU.

With reference to the first aspect, in some implementations, the vehicle system further includes a display. After the second ECU starts the first function or refuses to start the first function, the display may display prompt information, where the prompt information is used to indicate the result of starting the first function by the second ECU. Herein, the second ECU may directly send the result of starting the first function to the display, or may send the result to the display by using the first ECU. In this way, the user can intuitively learn of the starting result of the second ECU from the display of the vehicle system.

With reference to the first aspect, in some implementations, before sending, to the second ECU, the first instruction encrypted by using the first private key, the first ECU may further determine, based on the quantity of same CAs included in the first CA and the second CA, a function that is allowed to be accessed by the first ECU. The larger quantity of same CAs included in the first CA and the second CA indicates a larger quantity of functions that are allowed to be accessed by the first ECU. When the function that is allowed to be accessed by the first ECU includes indicating the second ECU to start the first function, the first ECU sends the first instruction encrypted by using the first private key to the second ECU.

With reference to the first aspect, in some implementations, the first ECU further stores a first certificate chain, the second ECU further stores a second certificate chain, the first certificate chain includes a digital certificate of the first CA, and the second certificate chain includes a digital certificate of the second CA. The method further includes: The first ECU sends the first certificate chain to the second ECU. In this way, the second ECU can determine a matching degree between the first CA and the second CA based on the certificate chains of the two parties.

With reference to the first aspect, in some implementations, before that the first ECU sends a first instruction encrypted by using the first private key to the second ECU, the method further includes: The first ECU determines that the second digital certificate is valid, and that the second ECU is a valid holder of the second digital certificate. The second ECU interacts with the first ECU only when the second ECU verifies that the first digital certificate of the first ECU is valid and that the second ECU is a valid holder of the first digital certificate. In this way, an internal security level of the vehicle system can be improved.

With reference to the first aspect, in some implementations, before that the second ECU decrypts the encrypted first instruction by using the first public key, the method further includes: The second ECU determines that the first digital certificate is valid, and that the first ECU is the valid holder of the first digital certificate. The first ECU interacts with the second ECU only when the first ECU verifies that the second digital certificate of the second ECU is valid and that the first ECU is the valid holder of the second digital certificate. In this way, the internal security level of the vehicle system can be improved.

With reference to the first aspect, in some implementations, that the second ECU determines that the first digital certificate is valid specifically includes: The second ECU determines that the first digital certificate is issued by a trusted CA, or the second ECU determines that the first digital certificate is issued by a trusted CA and is within a validity period.

In some implementations, when the first private key and the first public key are a key pair, the first ECU is the valid holder of the first digital certificate.

In some implementations, the first ECU may further send a first signature to the second ECU, where the first signature is obtained after a random number is processed by using the first private key; and the second ECU verifies the first signature by using the first public key, where when a verification result is the same as the random number, the first private key and the first public key are the key pair.

With reference to the first aspect, in some implementations, the first CA or the second CA includes one or more of the following: a root CA, an automotive manufacturer CA, a brand CA, a model CA, a vehicle CA, or a domain CA.

With reference to the first aspect, in some implementations, the first ECU is an ECU of a vehicle-mounted T-box, and the second ECU is an ECU of an engine, or the second ECU is an ECU of a vehicle-mounted T-box.

According to a second aspect, this application provides a vehicle-mounted device control method. The method is applied to a second ECU, and the second ECU stores a second digital certificate. The method may include: The second ECU receives a first digital certificate sent by a first ECU, where the first ECU stores the first digital certificate and a first private key, and the first digital certificate includes a first public key; the second ECU receives a first instruction that is sent by the first ECU and that is encrypted by using the first private key, where the first instruction is used to instruct the second ECU to start a first function; the second ECU decrypts the encrypted first instruction by using the first public key; and the second ECU determines, based on a quantity of same CAs included in a first certificate authority CA and the second CA, a function that is allowed to be accessed by the second ECU, where the first CA is a CA issuing the first digital certificate, the second CA is a CA issuing the second digital certificate, there are a plurality of first CAs and a plurality of second CAs, a larger quantity of same CAs included in the first CA and the second CA indicates a larger quantity of functions that are allowed to be accessed by the second ECU; and if the function that is allowed to be accessed by the second ECU includes the first function, the second ECU starts the first function, or if the function that is allowed to be accessed by the second ECU does not include the first function, the second ECU refuses to start the first function.

With reference to the second aspect, in some implementations, after that the second ECU starts the first function or the second ECU refuses to start the first function, the method further includes: The second ECU sends a result of starting the first function to the first ECU. In this way, the first ECU can send the result to a display in a vehicle-mounted device or an electronic device such as a mobile phone, so that a user learns of the result of starting the first function by the second ECU.

With reference to the second aspect, in some implementations, after that the second ECU starts the first function or the second ECU refuses to start the first function, the method further includes: The second ECU sends the result of starting the first function to a display in a vehicle-mounted system, so that the display displays prompt information, where the prompt information is used to indicate the result of starting the first function by the second ECU. In this way, the user can easily learn of the result of starting the first function by the second ECU.

With reference to the second aspect, in some implementations, the first ECU further stores a first certificate chain, the second ECU further stores a second certificate chain, the first certificate chain includes a digital certificate of the first CA, and the second certificate chain includes a digital certificate of the second CA. The method further includes: The second ECU receives the first certificate chain sent by the first ECU, and the second ECU determines, based on the certificate chains of the two parties, a degree of matching between the first CA and the second CA.

With reference to the second aspect, in some implementations, before that the second ECU decrypts the encrypted first instruction by using the first public key, the method further includes: The second ECU determines that the first digital certificate is valid, and that the first ECU is a valid holder of the first digital certificate. The second ECU interacts with the first ECU only when the second ECU verifies that the first digital certificate of the first ECU is valid and that the second ECU is a valid holder of the first digital certificate. In this way, an internal security level of the vehicle system can be improved.

In some implementations, that the second ECU determines that the first digital certificate is valid specifically includes: The second ECU determines that the first digital certificate is issued by a trusted CA, or the second ECU determines that the first digital certificate is issued by a trusted CA and is within a validity period.

In some implementations, when the first private key and the first public key are a key pair, the first ECU is the valid holder of the first digital certificate.

In some implementations, before determining the first private key and the first public key are the key pair, the second ECU may further receive a first signature sent by the first ECU, where the first signature is obtained after a random number is processed by using the first private key. The second ECU verifies the first signature by using the first public key, where when a verification result is the same as the random number, the first private key and the first public key are the key pair.

With reference to the second aspect, in some implementations, the first CA or the second CA includes one or more of the following: a root CA, an automotive manufacturer CA, a brand CA, a model CA, a vehicle CA, or a domain CA.

With reference to the second aspect, in some implementations, the first ECU is an ECU of a vehicle-mounted T-box, and the second ECU is an ECU of an engine, or the second ECU is an ECU of a vehicle-mounted T-box.

According to a third aspect, this application provides a vehicle-mounted device control method. The method is applied to a first ECU, and the first ECU stores a first digital certificate and a first private key. The method may include: The first ECU sends the first digital certificate to a second ECU, where the first digital certificate includes a first public key; and the first ECU sends, to the second ECU, a first instruction encrypted by using the first private key, where the first instruction is used to instruct the second ECU to start a first function.

With reference to the third aspect, in some implementations, after receiving a first message from an electronic device, the first ECU may send the first digital certificate to the second ECU in response to the first message. The first message is used to indicate the second ECU to start the first function.

For example, when the first ECU is an ECU of a vehicle-mounted T-box, the electronic device such as a mobile phone may send a remote control instruction to a server in response to a user operation, and the server forwards the remote control instruction to the first ECU. The remote control message received by the first ECU is the first message. Herein, the server is configured to provide a remote vehicle control service.

With reference to the third aspect, in some implementations, the second ECU nay further receive a result of starting the first function that is sent by the second ECU, and send a second message to the electronic device, where the second message is used to indicate the result of starting the first function by the second ECU. In this way, the electronic device may output prompt information of the result, so that the user learns of the result of starting the first function by the second ECU.

With reference to the third aspect, in some implementations, before that the first ECU sends, to the second ECU, a first instruction encrypted by using the first private key, the method further includes: The first ECU determines, based on a quantity of same CAs included in a first CA and a second CA, a function that is allowed to be accessed by the first ECU, where a larger quantity of same CAs included in the first CA and the second CA indicates a larger quantity of functions that are allowed to be accessed by the first ECU. When the function that is allowed to be accessed by the first ECU includes indicating the second ECU to start the first function, the first ECU sends the first instruction encrypted by using the first private key to the second ECU.

With reference to the third aspect, in some implementations, the first ECU further stores a first certificate chain, the second ECU further stores a second certificate chain, the first certificate chain includes a digital certificate of the first CA, and the second certificate chain includes a digital certificate of the second CA. The first ECU may further send the first certificate chain to the second ECU. In this way, the second ECU can determine a matching degree between the first CA and the second CA based on the certificate chains of the two parties.

With reference to the third aspect, in some implementations, before that the first ECU sends a first instruction encrypted by using the first private key to the second ECU, the method further includes: The first ECU determines that the second digital certificate is valid, and that the second ECU is a valid holder of the second digital certificate. In this way, an internal security level of a vehicle system can be improved.

With reference to the third aspect, in some implementations, the first ECU may further send a first signature to the second ECU, and the first signature is obtained after a random number is processed by using the first private key. In this way, the second ECU can verify whether the first ECU is a valid holder of the first digital certificate.

With reference to the third aspect, in some implementations, the first ECU is an ECU of a vehicle-mounted T-box, and the second ECU is an ECU of an engine, or the second ECU is an ECU of a vehicle-mounted T-box.

According to a fourth aspect, this application provides a vehicle system. The vehicle system includes a first ECU and a second ECU, and the vehicle system is configured to perform the method described in any one of the first aspect or the implementations of the first aspect.

According to a fifth aspect, this application provides an ECU, including a security chip, one or more processors, and one or more memories. The security chip and the one or more memories are coupled to the one or more processors, the security chip is configured to store a second digital certificate, the one or more memories are configured to store computer program code, the computer program code includes computer instructions, and when the one or more processors execute the computer instructions, the ECU is enabled to perform the method described in any one of the second aspect or the implementations of the second aspect.

According to a sixth aspect, this application provides an ECU, including a security chip, one or more processors, and one or more memories. The security chip and the one or more memories are coupled to the one or more processors, the security chip is configured to store a first digital certificate, the one or more memories are configured to store computer program code, the computer program code includes computer instructions, and when the one or more processors execute the computer instructions, the ECU is enabled to perform the method described in any one of the third aspect or the implementations of the third aspect.

According to a seventh aspect, this application provides an in-car infotainment system, including the ECU according to the fifth aspect and a communications interface. The communications interface is configured to communicate with an internet server.

According to an eighth aspect, this application provides a computer storage medium, including computer instructions. When the computer instructions are run on an electronic device, the electronic device is enabled to perform the method described in any one of the second aspect or the implementations of the second aspect.

According to a ninth aspect, this application provides a computer program product. When the computer program product runs on a computer, the computer is enabled to perform the method described in any one of the second aspect or the implementations of the second aspect.

According to a tenth aspect, this application provides a computer storage medium, including computer instructions. When the computer instructions are run on an electronic device, the electronic device is enabled to perform the method described in any one of the third aspect or the implementations of the third aspect.

According to an eleventh aspect, this application provides a computer program product. When the computer program product runs on a computer, the computer is enabled to perform the method described in any one of the third aspect or the implementations of the third aspect.

According to the technical solutions provided in this application, a digital certificate is used to perform security authentication between ECUs, so that a security level of a vehicle system can be improved. In addition, the method does not need to distinguish between a main ECU and a key ECU. This reduces a requirement for storage space. In addition, certificate chain matching degrees are different in a security method between the ECUs, and functions that can be accessed by an ECU 2 are different. According to this method, ECU resource waste caused by unity of an authentication result in the conventional technology is avoided, costs and resources are saved, and user experience is improved. In addition, after an ECU in the vehicle system is replaced into another vehicle system, the ECU may further restrict some functions and continue to run. In this way, the ECU can be appropriately reused, the costs and the resources can be saved, and user experience can be improved.

DESCRIPTION OF EMBODIMENTS

Figure 1:
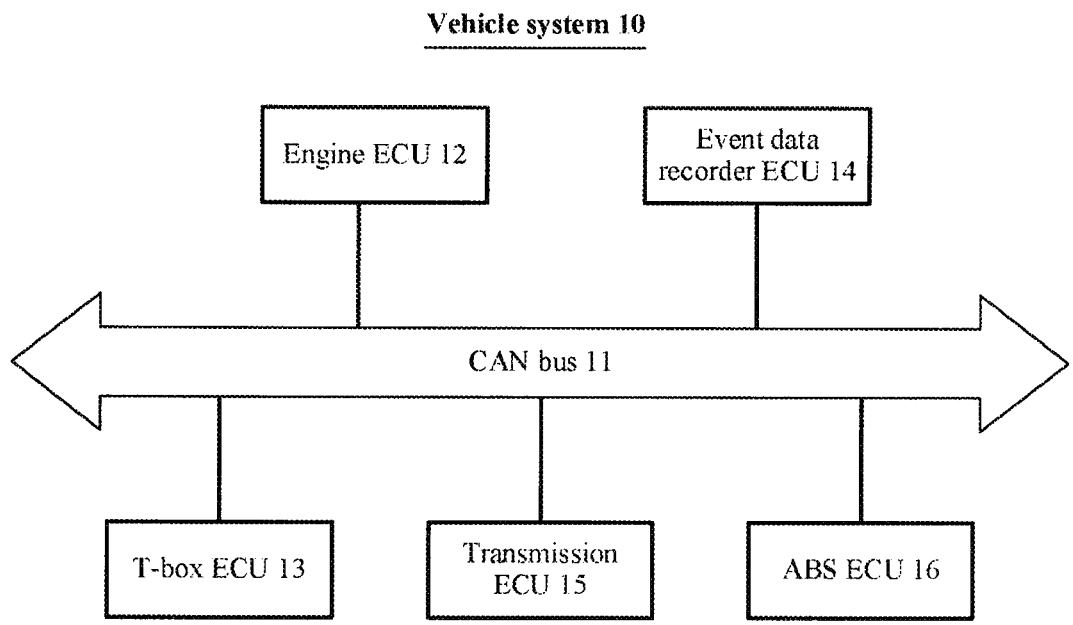
FIG. 1 is a schematic diagram of a structure of a vehicle system according to an embodiment of this application.

The technical solutions according to embodiments of this application are clearly and completely described in the following with reference to the accompanying drawings. Terms used in the following embodiments are merely intended to describe specific embodiments, but are not intended to limit this application. Terms "one", "a", "the", "the foregoing", "this", and "the one" of singular forms used in this specification and the appended claims of this application are also intended to include plural forms, unless otherwise specified in the context clearly. It should be further understood that "/" in the embodiments of this application means "or", and "and/or" means and includes any or all possible combinations of one or more listed items.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

A term "user interface (user interface, UI)" in the specification, claims, and accompanying drawings of the embodiments of this application is a medium interface for interaction and information exchange between a user and an application or an operating system, and implements conversion between an internal form of information and a form acceptable to the user. A user interface of an application is source code written in a specific computer language, for example, Java or an extensible markup language (extensible markup language, XML). The source code of the interface is parsed and rendered on a terminal device, and is finally presented as user-recognizable content, for example, a control, for example, a picture, a text, or a button. The control (control), also referred to as a widget (widget), is a basic element on the user interface. Typical controls include a toolbar (toolbar), a menu bar (menu bar), a text box (text box), a button (button), a scrollbar (scrollbar), a picture, and a text. An attribute and content of a control on an interface are defined by using a tag or a node. For example, the control included in the interface is defined in the XML by using a node, for example, <Textview>, <ImgView>, or <VideoView>. One node corresponds to one control or one attribute on the interface. After being parsed and rendered, the node is presented as user-visible content. In addition, interfaces of many applications such as a hybrid application (hybrid application) usually further include a web page. A web page, also referred to as a page, may be understood as a special control embedded in an interface of an application. A web page is source code written in a specific computer language, for example, a hypertext markup language (hypertext markup language, HTML), cascading style sheets (cascading style sheets, CSS), or JavaScript (JavaScript, JS). The web page source code may be loaded and displayed as user-recognizable content by a browser or a web page display component with a function similar to a function of the browser. Specific content included in the web page is also defined by using a tag or a node in the web page source code. For example, an element and an attribute of the web page are defined in the HTML by using <p>, <img>, <video>, or <canvas>.

The user interface is usually represented in a form of a graphical user interface (graphical user interface, GUI), and is a user interface that is related to a computer operation and that is displayed in a graphic manner. The user interface may be an interface element such as an icon, a window, or a control displayed on a display of an electronic device, and the control may include a visual interface element such as an icon, a button, a menu, a tab, a text box, a dialog box, a status bar, a navigation bar, or a widget.

Currently, ECUs in a vehicle system may be classified into a primary ECU and a key ECU. There is one primary ECU, and there may be a plurality of key ECUs. The master ECU stores a symmetric key of each key ECU, and performs verification by using the method described in the background. This authentication manner not only has a low security level, but also requires large storage space of the master ECU to store symmetric keys of the plurality of key ECUs. In addition, the ECU has a single control policy, and an authentication result of the master ECU on the key ECU is only valid or invalid. This results in a waste of resources and poor user experience.

The following embodiments of this application provide a vehicle-mounted device control method, a vehicle device, and a vehicle system. In the method, before an ECU 1 in the vehicle system indicates an ECU 2 to start a first function, the two parties need to mutually verify validity of a digital certificate of each other, and further determine whether the other party is a valid holder of the digital certificate. When the two parties confirm that the digital certificate of the other party is valid and the other party is a valid holder of the digital certificate, the ECU 2 determines, based on a matching degree of certificate chains of the two parties, a function that can be opened by the ECU 2 to the ECU 1. If the first function is included in functions that are currently allowed to be accessed by the ECU 2, the ECU 2 starts the first function.

According to the vehicle-mounted device control method provided in this embodiment of this application, a digital certificate is used to perform security authentication between ECUs, so that a security level of the vehicle system can be improved. In addition, the method does not need to distinguish between a main ECU and a key ECU. This reduces a requirement for storage space. In addition, certificate chain matching degrees are different in a security method between the ECUs, and functions that can be accessed by an ECU 2 are different. According to this method, ECU resource waste caused by unity of an authentication result in the conventional technology is avoided, costs and resources are saved, and user experience is improved. In addition, after an ECU in the vehicle system is replaced into another vehicle system, the ECU may further restrict some functions and continue to run. In this way, the ECU can be appropriately reused, costs and resources can be saved, and user experience can be improved.

Concepts such as a digital certificate, validity of the digital certificate, a valid holder of the digital certificate, a certificate chain, and an open function of the ECU are explained in detail in subsequent method embodiments of this application. Details are not described herein.

First, a vehicle system in the embodiments of this application is described.

FIG. 1 is a schematic diagram of a structure of a vehicle system 10 according to an embodiment of this application.

As shown in FIG. 1, the vehicle system 10 may include a plurality of ECUs and a CAN bus 11 connected to the plurality of ECUs. The plurality of ECUs may include, for example, an engine ECU 12, a telematics box (telematics box, T-box) ECU 13, a transmission ECU 14, an event data recorder ECU 15, and an antilock brake system (antilock brake system, ABS) ECU 16.

The CAN bus 11 is a bus of a broadcast type, and may be used to transmit data between any two ECUs. Any ECU on the CAN bus 11 can monitor all data transmitted on the CAN bus 11. A frame transmitted by the CAN bus 11 may include a data frame, a remote frame, an error frame, and an overload frame. Different frames transmit different types of data. In this embodiment of this application, the CAN bus 11 may be configured to transmit data involved in a security authentication and control process of the ECU. For the security authentication and control process, refer to detailed descriptions in the following embodiments.

The ECU is also called a "trip computer" or a "vehicle-mounted computer". It is the same as a common computer, that is, "the ECU is the brain of a vehicle". In the following embodiments of this application, the ECU may also be referred to as a vehicle-mounted device, a trip computer, a vehicle-mounted computer, or another term. This is not limited herein. The following embodiments are described by using an ECU as an example.

Each ECU in the vehicle system 10 may include a plurality of functions, which are described in detail below.

The engine ECU 12 is configured to manage an engine and coordinate functions of the engine, for example, may be configured to start the engine, shut down the engine, and the like. The engine is an apparatus that powers a vehicle. An engine is a machine that converts energy of a specific type into mechanical energy. A function of the engine is to convert chemical energy of liquid or gas combustion into heat energy through combustion, convert the heat energy into mechanical energy through expansion, and output power. Engine components may include two major mechanisms: crank-link mechanism and valve mechanism, and five major systems such as cooling, lubrication, ignition, fuel supply, and startup system. Main components are a cylinder block, a cylinder head, a piston, a piston pin, a connecting rod, a crankshaft, a flywheel and so on. A working principle of the engine is to control fuel mixing and ignition timing based on a feedback signal of a sensor connected to the engine. Based on a rotational speed and load of the engine, action instructions are sent to a fuel injector and a fuel supply pump through calculation and processing of the ECU. In this way, each cylinder has the most appropriate fuel injection volume, fuel injection rate, and fuel injection time. This ensures optimal combustion of each cylinder.

A T-box ECU 13 is configured to manage the T-box. The T-box is mainly configured to communicate with a background system/an electronic device (for example, a mobile phone). Vehicle control and vehicle information display may be further implemented on the electronic device end.

The T-box may also be referred to as an in-car infotainment system, a remote information processor, a vehicle gateway, or the like. This is not limited in this embodiment of this application.

When a user sends a control instruction by using a vehicle control application (application, APP) on an electronic device end, a background system (for example, a server) forwards the received control instruction to the T-box ECU 13. After obtaining the control instruction, the T-box ECU 13 sends a control packet by using the CAN bus 11, to control the vehicle, for example, start an engine, turn on an air conditioner, adjust a seat to a proper position, open a car door/window/light/lock/horn/skylight, and finally feed back an operation result to the electronic device. In addition, the T-box ECU 13 may further read data of each ECU by using the CAN bus 11, for example, obtain data such as a vehicle condition report, a driving report, fuel consumption statistics, a violation query, a location track, and a driving behavior, and transmit the data to the background system by using a network. The background system forwards the data to the electronic device for the user to view.

The transmission ECU 14 is configured to manage the transmission. The transmission can be used to change a mechanism of the rotational speed and torque of the engine, and can fix or grade a transmission ratio of an output shaft to an input shaft. The transmission component may include a variable speed transmission mechanism, a control mechanism, a power output mechanism, and the like. A main function of the variable speed transmission mechanism is to change values and directions of the torque and rotational speed. A main function of the control mechanism is to control the transmission mechanism to change the transmission ratio of the transmission, that is, to change a gear, so as to change a speed and torque.

The event data recorder ECU 15 is configured to manage an event data recorder. Components of the event data recorder may include a host, a vehicle speed sensor, data analysis software, and the like. The event data recorder is an instrument that records an image and sound of the vehicle, including a driving time, a speed, and a location. In this embodiment of this application, when the vehicle travels, the vehicle speed sensor collects a wheel rotational speed, and sends vehicle speed information to the event data recorder by using the CAN bus.

The ABS ECU 16 is used to manage an ECU. An ABS automatically controls a braking power of a brake when the vehicle is braking. In this way, wheels can be prevented from locking up and can be in a rolling and sliding state (a slip rate is about 20%), so as to ensure that adhesion between the wheels and the ground is a maximum value. In a braking process, when an electronic control apparatus determines, based on a wheel rotational speed signal input by a wheel rotational speed sensor, that a wheel tends to be locked up, the ABS enters an antilock brake pressure adjustment process.

In this embodiment of this application, each ECU stores a private key and a digital certificate of the ECU. In some embodiments, the ECU may further store a certificate chain. Detailed explanations of the private key, the digital certificate, and the certificate chain are described in subsequent embodiments, and details are not described herein.

Security authentication may be performed between ECUs in this embodiment of this application. Specifically, before the ECU 1 in the vehicle system indicates the ECU 2 to start the first function, the two parties need to mutually verify validity of a digital certificate of each other, and further determine whether the other party is a holder of the digital certificate. When the two parties confirm that the digital certificate of the other party is valid and the other party is the valid holder of the digital certificate, the ECU 2 determines, based on a matching degree of certificate chains of the two parties, a function that can be opened by the ECU 2 to the ECU 1. If the first function started by the ECU 2 that is indicated by the ECU 1 is included in the functions that are allowed to be accessed, the ECU 2 starts the first function. Concepts related to the validity of the digital certificate, the valid holder of the digital certificate, the matching degree of the certificate chains, and an open function of an ECU are described in detail in subsequent embodiments.

Both the ECU 1 and the ECU 2 may be any ECU in the vehicle system 10 in this embodiment of this application.

A scenario in which the ECU 1 indicates the ECU 2 to start the first function may include, for example, the following: The T-box ECU 13 controls the engine ECU 12 to start/shut down the engine, and the T-box ECU 13 controls the transmission ECU 14 to change a speed.

It may be understood that an example structure in this embodiment of this application does not constitute a specific limitation on the vehicle system. The vehicle system may include more or fewer components than those shown in the figure, or some components may be combined, or some components may be split, or there may be a different component arrangement. The components shown in the figure may be implemented by hardware, software, or a combination of software and hardware.

For example, without being limited to a CAN bus, in some other embodiments, ECUs in the vehicle system may be connected and communicate in other manners. For example, each ECU may alternatively be connected and communicate through a bus such as an automotive Ethernet (Ethernet), a common in-vehicle network LIN, a FlexRay, a common in-vehicle network system MOST (media oriented systems, MOST), or the like. This is not limited in this embodiment of this application. The following embodiments are described by using an example in which the ECUs communicate with each other through the CAN bus.

The following describes a structure of an ECU according to an embodiment of this application.

The ECU may include a security chip, a microprocessor (microcontroller unit, MCU), a random access memory (random access memory, RAM), a read-only memory (random-only memory, ROM), an input/output interface (I/O), an analog/digital converter (A/D converter), and a large-scale integrated circuit such as an input, an output, shaping, and a drive.

The security chip is configured to store a digital certificate and a private key of the ECU. For detailed explanations of the digital certificate, refer to descriptions in subsequent embodiments. Details are not described herein again.

The A/D converter converts analog signals into digital signals that can be processed by the MCU. Most signals sent by a sensor are analog signals. The A/D converter converts voltage signals preprocessed through an input loop into digital signals, and then sends the converted digital signals to the MCU.

The MCU is a center of the ECU. The MCU uses a memory program and data to calculate an input signal as required, and sends a processing result to an output loop.

The RAM is mainly used to store variable data during calculator operations. For example, the RAM is used to store input and output data of a computer and intermediate data generated in a computer process. When a power supply is cut off, RAM data disappears.

The ROM can only read a memory to store fixed data, for example, permanently stored programs and data stored by a manufacturer at a time during vehicle production, such as engine fuel injection characteristic pulse spectrum and ignition characteristic pulse spectrum. When the power supply is cut off, the ROM data does not disappear.

The following describes concepts related to the embodiments of this application, such as a digital certificate, validity of the digital certificate, a valid holder of the digital certificate, and a certificate chain.

(1) Digital Certificate

A digital certificate is an electronic certificate issued by a digital certificate authority (certificate authority, CA) to identify identity information of a digital certificate holder, and provides a method of verifying an identity of a peer end.

The CA is an authoritative organization responsible for issuing and managing digital certificates. As a trusted third party on a network, the CA is responsible for verifying validity of a public key in a public key system, including verifying an identity of a device that applies for a digital certificate, managing and updating a digital certificate, maintaining a digital certificate revocation list (revoked digital certificates), or the like. The CA has its own private key and public key. The private key is used to sign a digital certificate of the applicant device, and the public key is used to verify whether the digital certificate is issued by the CA, that is, whether the digital certificate is valid.

A format of the digital certificate may comply with different international standards, for example, X.509v3 (1997), X509v4 (1997), X.509v1 (1988), and TUTrec.x.509V3 formulated by the International Telecommunication Union. This is not limited in this embodiment of this application.

Figure 2:
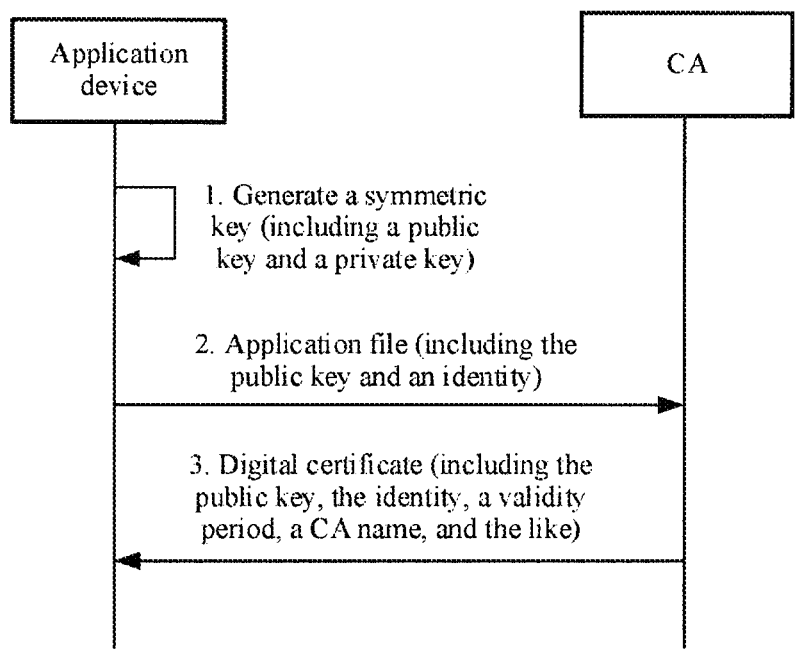
FIG. 2 is a flowchart of issuing a digital certificate by a CA according to an embodiment of this application.

FIG. 2 shows a process in which a CA issues a digital certificate. As shown in FIG. 2, the process may include the following steps.

1. An applicant device generates a symmetric key, where the symmetric key includes a pair of a public key and a private key.

The applicant device may generate the pair of the public key and the private key by using an asymmetric encryption algorithm. The private key is kept by the applicant device, and the public key may be notified to a plurality of persons. Herein, the symmetric key may alternatively be generated by the CA.

2. The applicant device applies for a digital certificate from the CA.

Specifically, the applicant device sends an application file to the CA, where the application file includes information such as the public key and an identity of the applicant device. The application file is used to apply for the digital certificate from the CA.

3. The CA generates the digital certificate for the applicant device and issues the digital certificate to the applicant device.

In some embodiments, before step 3, the CA may further confirm that the application document sent by an applicant device 1 is correct.

The CA creates a digital document based on the application file sent by the applicant device, where the digital document may include the public key and the identity of the applicant device, a validity period of the digital document, a name of a digital certificate authority, and the like. Then, the CA uses a digest algorithm to calculate the digital document to obtain a digital digest. Second, the CA uses its private key to sign the digital digest, digital document, and digest algorithm used for calculating the digital digest to generate a digital certificate. A digital certificate signing process is equivalent to locking content in the digital certificate to prove that the digital certificate is issued by the CA. Finally, the CA generates the digital certificate and issues the digital certificate to the applicant device. Generally, the validity period ranges from one to five years from a date when the digital certificate is issued.

It is clear that the digital certificate received by the applicant device may include information such as a serial number of the digital certificate, a validity period of the digital certificate, an identity of a digital certificate holder, a public key of the digital certificate holder, and an identifier of the CA that issues the digital certificate. The identifier of the CA may be, for example, a name or a number of the CA.

After receiving the digital certificate issued by the CA, the applicant device can use the digital certificate for identity authentication during communication, so as to ensure secure and reliable communication between communication parties. Specifically, each digital certificate holder has a private key known only to the holder, and uses the private key for decryption and signature. Each digital certificate holder also has a public key and can disclose the public key to the public for encryption and signature verification. When sending data, a sender uses a public key of a receiver to encrypt the data. After receiving the data, the receiver uses a private key to decrypt the data. In this way, the data can reach a destination securely and correctly. Even if the data is intercepted by a third party, the data cannot be decrypted because the corresponding private key is unavailable.

(2) Validity of the Digital Certificate

In some embodiments, a digital certificate issued by the trusted authoritative CA is a valid digital certificate.

In some other embodiments, a digital certificate issued by the trusted authoritative CA and within a validity period is a valid digital certificate.

In this embodiment of this application, whether the digital certificate is issued by the trusted authoritative CA may be verified in a digital signature manner. Specifically, after receiving the digital certificate, the authenticator may perform signature verification on the digital certificate by using the public key corresponding to the authoritative CA carried in the digital certificate, to obtain a digital digest, a digest algorithm, and a digital document. Then, the authenticator uses the digest algorithm to calculate the digital document to obtain a new digital digest, and compares the digital digest with the digital digest in the digital certificate. If the two digital digests are the same, the digital certificate passes the signature verification and is issued by the CA. That is, the digital certificate is valid. In some other embodiments, the authenticator may further determine whether the digital certificate is within the validity period. If the digital certificate is issued by the authoritative CA and is within the validity period, the digital certificate is valid.

(3) Valid Holder of the Digital Certificate

After an applicant device successfully applies for a digital certificate from the CA, the applicant device becomes a valid holder of the digital certificate.

In a subsequent process, the digital certificate of the applicant device may be stolen, tampered with, or the like by another unauthorized user, and the another unauthorized user is not a valid holder of the digital certificate. It is clear that there is only one valid holder of the digital certificate.

The private key used by the applicant device to apply for the digital certificate is owned only by the applicant device. Therefore, the private key can be used to confirm the valid holder of the digital certificate. Specifically, if the other party owns the private key, the other party is a valid holder of the digital certificate. In specific implementation, an authenticator may send a random number to an authenticated party, and the authenticated party obtains a return value after encrypting the random number by using its own private key, and sends the return value to the authenticator. The authenticator uses a public key of the authenticated party to encrypt the random number. If an encryption result is consistent with the return value, the authenticated party has the private key corresponding to the public key carried in the digital certificate. That is, the authenticated party is the valid holder of the digital certificate.

In this embodiment of this application, after the two communicating ECUs confirm that the digital certificate of each other is valid and the other party is the valid holder of the digital certificate, the digital certificate may be used to encrypt and decrypt transmitted information, so as to ensure confidentiality and authenticity of information transmitted between the ECUs in the vehicle system. For a process of encrypting and decrypting the information by using the digital certificate, refer to related descriptions in subsequent method embodiments.

Figure 3:
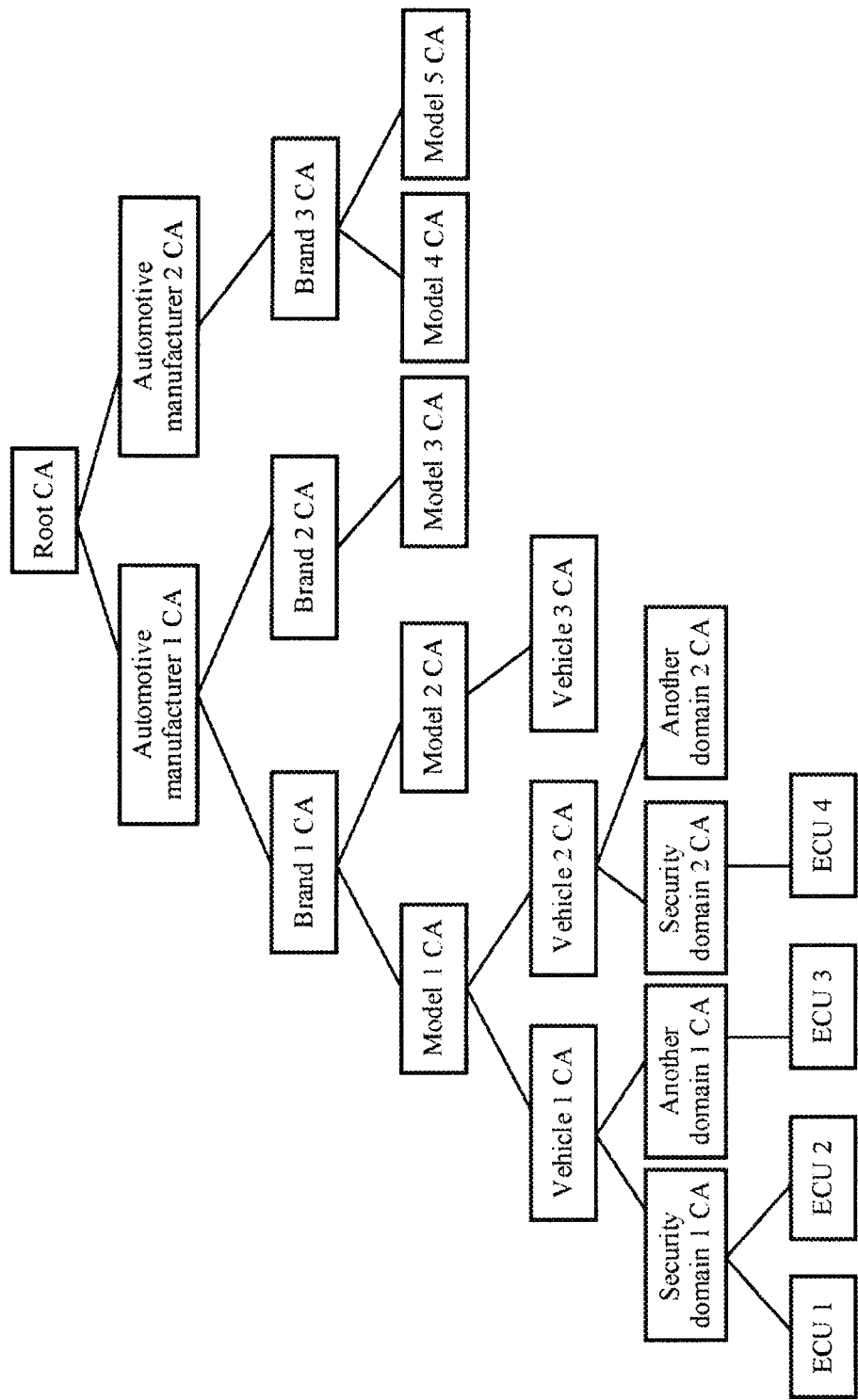
FIG. 3 is a structural diagram of a digital certificate issuing system according to an embodiment of this application.

(4) Digital Certificate Issuing System Provided in the Embodiments of this Application FIG. 3 is a structural diagram of a system for issuing a digital certificate to each ECU in a vehicle system according to an embodiment of this application.

As shown in FIG. 3, the digital certificate issuing system in this embodiment of this application uses a multi-layer hierarchical structure. A quantity of levels of the digital certificate issuing system is not limited in this application.

For example, a CA system constructed by an automotive manufacturer based on vehicle information may include several layers from top to bottom: a root CA (Root CA), an automotive manufacturer CA, a brand CA, a model CA, a vehicle CA, and a domain CA. There is only one root CA. There can be one or more automotive manufacturer CAs, brand CAs, model CAs, vehicle CAs, and domain CAs. A specific quantity may be constructed based on vehicle production information of the automotive manufacturer. A quantity of CAs at each level of the digital certificate issuing system is not limited in this application.

The root CA is located at the top of the digital certificate issuing system. The root CA is the most authoritative third-party digital certificate authority in the entire CA system. For example, in the entire digital certificate system, the root CA can issue a digital certificate (root certificate) to itself. That is, the root CA can prove its valid identity.

A CA at each level can use its private key to issue a digital certificate to a lower-level CA. In this way, the CA issues a digital certificate to the ECU. The root CA issues a digital certificate to an automotive manufacturer 1 CA, indicating that the root CA trusts the automotive manufacturer 1 CA. The automotive manufacturer 1 CA issues a digital certificate to a brand 1 CA, indicating that the automotive manufacturer 1 CA trusts the brand 1 CA. In this way, a trust relationship is transmitted.

For a process in which each CA issues a digital certificate to a lower-layer CA or ECU, refer to FIG. 2. Details are not described herein again.

For example, the root CA may issue a digital certificate to a lower-level automotive manufacturer CA (for example, the automotive manufacturer 1 CA and an automotive manufacturer 2 CA) by using the private key of the root CA. If the automotive manufacturer CA obtains the digital certificate issued by the root CA, it indicates that the automotive manufacturer CA is trusted. Similarly, the trusted automotive manufacturer CA (for example, the automotive manufacturer 1 CA) may issue a digital certificate to a next-level brand CA (for example, the brand 1 CA, a brand 2 CA, and a brand 3 CA). By analogy, a trusted brand CA (for example, the brand 1 CA) may issue a digital certificate to a next-level model CA, . . . , a vehicle CA (for example, a vehicle 1 CA) may issue a digital certificate to an ECU (for example, a security domain 1 CA and a security domain 2 CA) in the vehicle system, and a domain CA (for example, the security domain 1 CA and another domain 1 CA) may issue a digital certificate to an ECU within jurisdiction of the security domain.

A CA hierarchical structure and a setting manner shown in FIG. 3 are merely examples, and more or fewer levels may be included. For example, a security domain CA may or may not be included between the root CA and the ECU.

(5) Certificate Chain

Based on the structural diagram of the digital certificate issuing system shown in FIG. 3, the following describes a certificate chain established based on the digital certificate issuing system.

Each device that has a digital certificate corresponds to a certificate chain. The certificate chain is an ordered list of certificates. In this embodiment of this application, the certificate chain of the ECU includes a digital certificate of the ECU and digital certificates of all CAs involved in issuing the digital certificate. The certificate chain enables the receiver to verify whether a sender and all CAs in the certificate chain of the sender are trusted. The certificate chain includes three parts: a root certificate, an intermediary certificate, and an ECU digital certificate.

The root certificate is a digital certificate signed and issued by the root CA using its private key. The signature verification of the root certificate requires a public key of the root CA.

The intermediary certificate is a digital certificate signed and issued by the root CA using its private key to an intermediary CA. The signature verification of the intermediary certificate requires the public key of the root CA. The intermediary certificate contains a name of the root certificate. The intermediary CA is a CA at another level except the root CA in the digital certificate issuing system, for example, an automotive manufacturer CA, a brand CA, a model CA, a vehicle CA, and a domain CA.

The ECU digital certificate is signed and issued by using a private key of an upper-level intermediary CA (the domain CA). The signature verification of the ECU digital certificate requires the public key of the domain CA. The ECU can save the certificate chain or obtain the certificate chain through query when the certificate chain is used.

In the certificate chain provided in this embodiment of this application, the root CA is the most authoritative and reliable digital certificate authority in the entire CA system, and is also a start point of the certificate chain. A digital certificate issuer of the root CA is the root CA itself. In a multi-level intermediary CA, a digital certificate of the highest-level intermediary CA is issued by the root CA, and the digital certificates of other intermediate CAs need to be issued by using a private key of an upper-level intermediary CA, and validity of the digital certificates needs to be verified by using a corresponding public key of the upper-level intermediary CA.

In this embodiment of this application, when validity of the ECU digital certificate is verified, the root certificate needs to be traced back step by step. Specifically, it is first confirmed that the digital certificate is a valid digital certificate issued by an upper-layer CA (for example, the security domain 1 CA). Then validity of the upper-layer CA (for example, the security domain 1 CA) is confirmed. By analogy, validity of an original issuer (that is, the root CA) of the ECU digital certificate is confirmed. If the root CA is a trusted and authoritative CA, the ECU digital certificate is valid.

Based on the vehicle system 10 described in FIG. 1, the digital certificate issuing process shown in FIG. 2, and the digital certificate issuing system described in FIG. 3, the following describes a vehicle-mounted device control method provided in an embodiment of this application.

In the method, before an ECU 1 in the vehicle system indicates an ECU 2 to start a first function, the two parties need to mutually verify validity of a digital certificate of each other, and further determine whether the other party is a holder of the digital certificate. When the two parties confirm that the digital certificate of the other party is valid and the other party is a valid holder of the digital certificate, the ECU 2 determines, based on a matching degree of certificate chains of the two parties, a function that can be opened by the ECU 2 to the ECU 1. If the first function is included in functions that are currently allowed to be accessed by the ECU 2, the ECU 2 starts the first function.

Both the ECU 1 and the ECU 2 may be any ECU in the vehicle system 10 in this embodiment of this application. For example, the ECU 1 may be a T-box ECU 13, and the ECU 2 may be an engine ECU 12.

The ECU 1 and the ECU 2 each store their own digital certificates and private keys. A private key of the ECU 1 is referred to as a private key 1, and a private key of the ECU 2 is referred to as a private key 2.

In this embodiment of this application, the digital certificate of the ECU includes a public key of the ECU and an identifier of a CA that issues the digital certificate. In some embodiments, the digital certificate of the ECU may further include information such as a validity period, a serial number, or an identity of a holder of the digital certificate. For a process in which the ECU obtains the digital certificate, refer to FIG. 2, FIG. 3, and related descriptions.

Figure 4A:
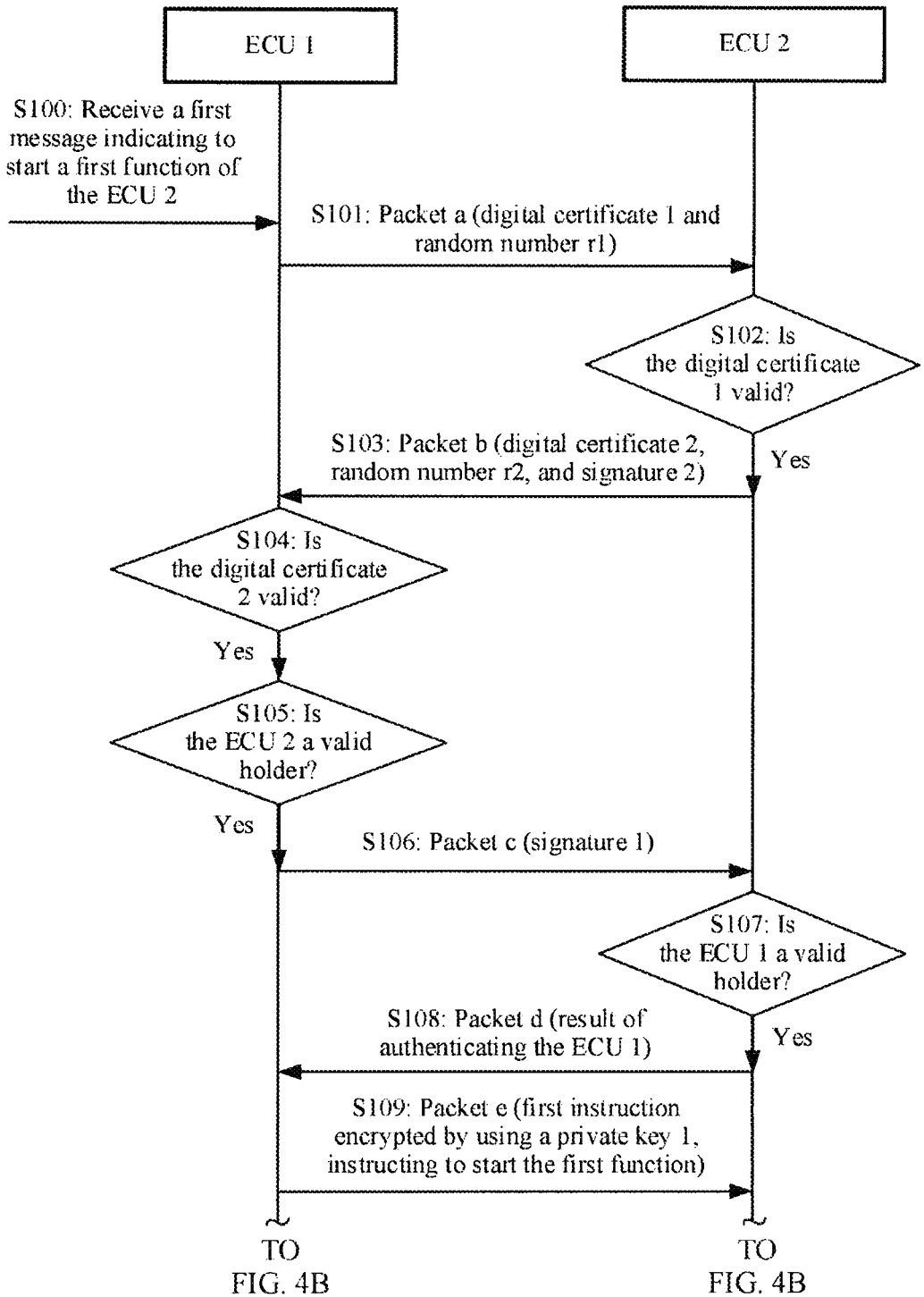
FIG. 4A and FIG. 4B are a schematic flowchart of a vehicle-mounted device control method according to an embodiment of this application.
Figure 4B:
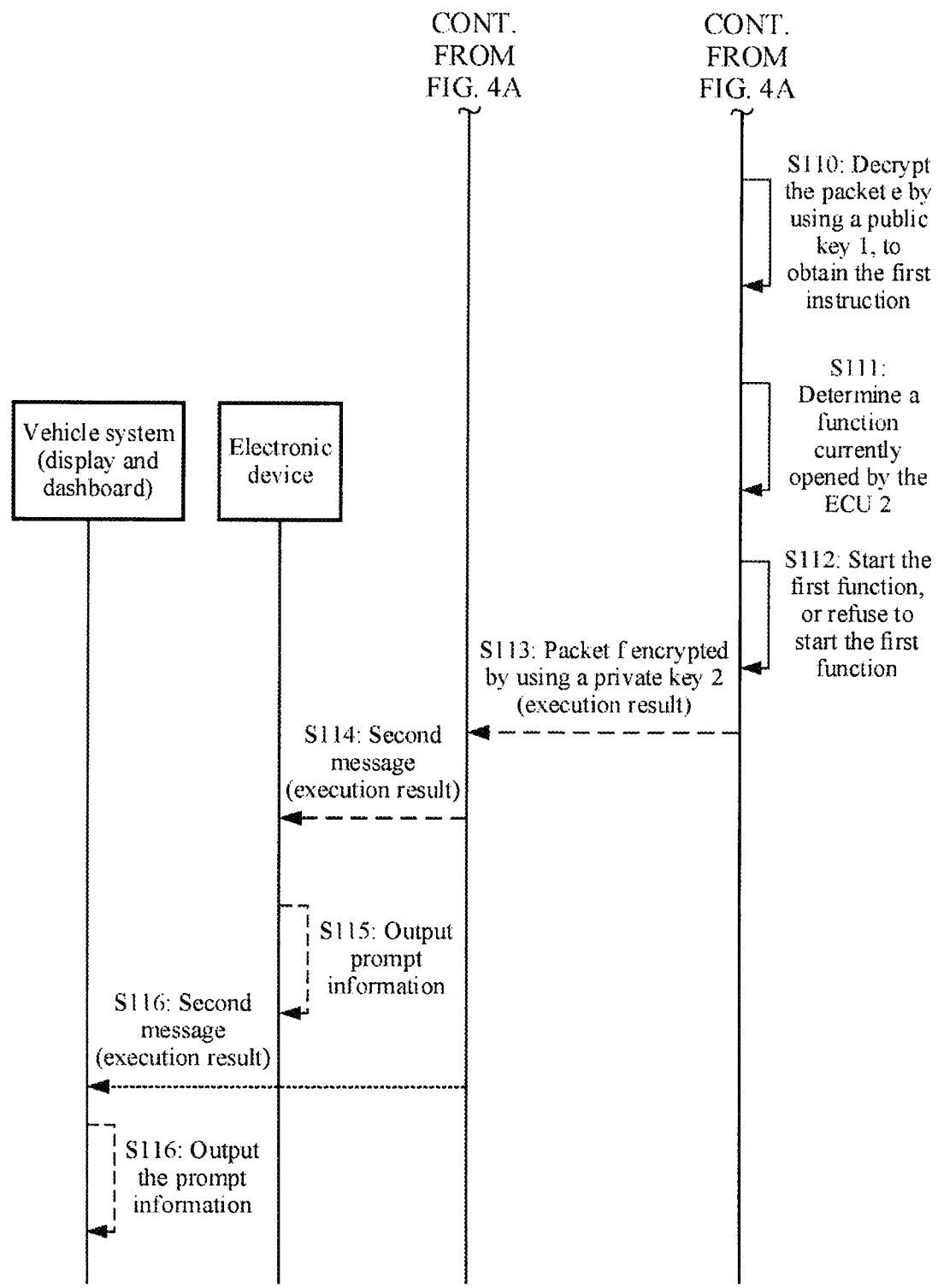

FIG. 4A and FIG. 4B are a flowchart of a vehicle-mounted device control method according to an embodiment of this application.

As shown in FIG. 4A and FIG. 4B, the method may include the following steps.

S100 to S108: A bidirectional authentication process between the ECU 1 and the ECU 2.

The ECU 1 and the ECU 2 verify validity of a digital certificate of the other party and whether the other party is a valid holder of the digital certificate. If the digital certificate is valid and the other party is the valid holder of the digital certificate, it can be confirmed that the digital certificate is issued by a trusted and authoritative CA and that the digital certificate is not forged by a third party. ECUs can securely communicate with each other based on the digital certificates only when the digital certificates of both parties are valid and the other party is the valid holder of the digital certificate. For concepts of verifying the validity of the digital certificate and the valid holder of the digital certificate, refer to the foregoing detailed descriptions.

S100: The ECU 1 receives a first message, where the first message is used to indicate the ECU 2 to start a first function.

The first message may be sent by another ECU in the vehicle system 10 to the ECU 1, or may be sent by an external device to the ECU 1. This is not limited herein.

For example, when the ECU 1 is the T-box ECU 13, a user may remotely control the ECU 1 by using an application (application, APP) installed on an electronic device or a web page on a computer end. Specifically, the electronic device may send a remote control instruction to a server in response to a user operation, the server forwards the remote control instruction to the ECU 1, and the remote control message received by the ECU 1 is the first message. Herein, the server is configured to provide a remote vehicle control service.

With reference to the user interface provided in this embodiment of this application, the following explains a scenario in which the ECU 1 receives the first message.

Figure 5A:
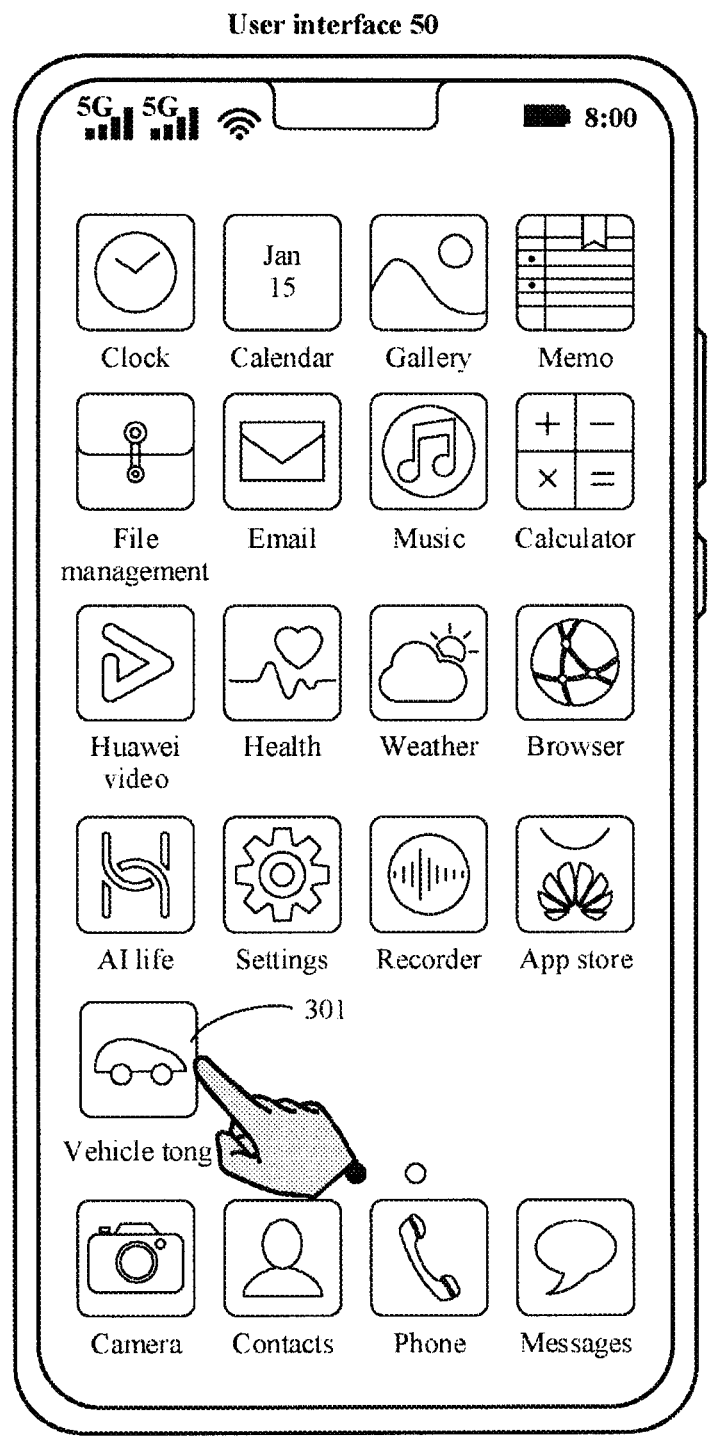
FIG. 5A and FIG. 5B show a group of user interfaces implemented on an electronic device according to an embodiment of this application.
Figure 5B:
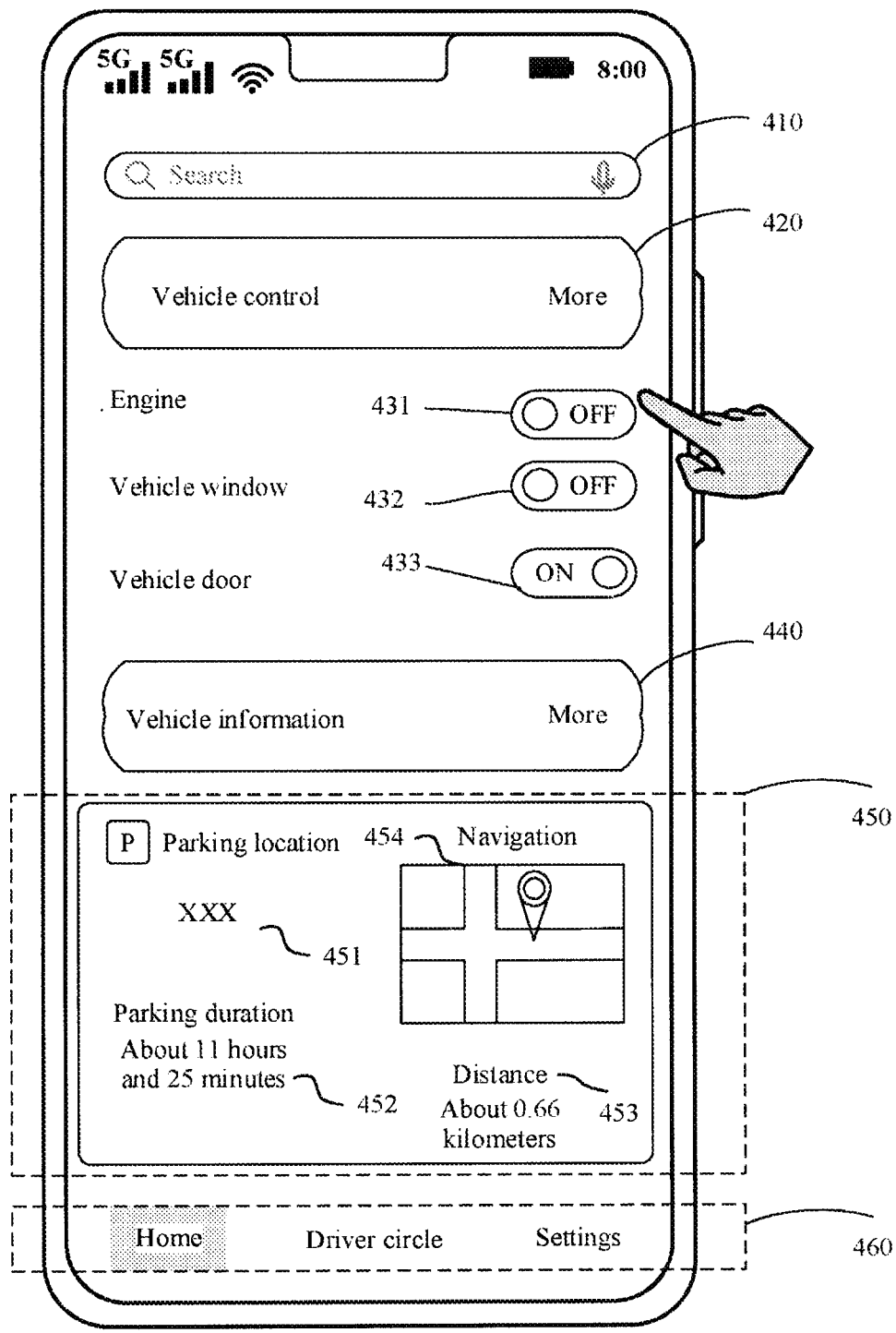

FIG. 5A and FIG. 5B show examples of user interfaces implemented on an electronic device (for example, a mobile phone).

FIG. 5A shows a user interface 300 displayed by the electronic device. As shown in FIG. 5A, the user interface 300 displays a status bar, a tray having a common application icon, a page indicator, another application icon, and the like. This is not limited thereto. The user interface 300 shown in FIG. 5A may further include a navigation bar, a sidebar, and the like. In some embodiments, the user interface 300 shown in FIG. 5A as an example may be a home screen (Home screen).

As shown in FIG. 5A, the another application icon may include, for example, an icon 301 of an application (for example, "Vehicle tong") used to manage a vehicle.

As shown in FIG. 5A, the electronic device may detect a user operation (for example, a tap operation or a touch operation) performed on the icon 301, and in response to the user operation, start the application (for example, "Vehicle tong") that is used to manage the vehicle and that corresponds to the icon 301, and display a user interface 400 provided by the application.

FIG. 5B illustrates an implementation form of a user interface 400. The user interface 400 is configured to remotely manage a vehicle.

As shown in FIG. 5B, the user interface 400 displays a search bar 410, a control 420, common controls 431 to 433, a control 440, an information display bar 450, and a menu bar 460.

The search bar 410 may be configured to listen to a touch operation, a tap operation, and the like. In response to the operation, the electronic device may display a virtual keyboard, so that the user enters content that the user wants to search for.

The control 420 is configured to listen to a user operation (for example, a tap operation or a touch operation). The electronic device may display more function controls in response to the user operation, for example, a control for turning on/off an air conditioner or a control for turning on/off an in-vehicle light.

The control 431 may be configured to listen to a user operation. In response to the user operation, the electronic device may send, to the T-box ECU 13 in the vehicle system by using the server, a message for indicating to start or shut down an engine.

The control 432 may be configured to listen to a user operation. In response to the user operation, the electronic device may send, to the T-box ECU 13 in the vehicle system by using the server, a message for indicating to open/close a window.

The control 433 may be configured to listen to a user operation. In response to the user operation, the electronic device may send, to the T-box ECU 13 in the vehicle system by using the server, a message for indicating to open/close a vehicle door.

The control 440 is configured to listen to a user operation (for example, a tap operation or a touch operation). In response to the user operation, the electronic device may display more vehicle information, for example, a fuel volume or a running volume today.

The information display bar 450 may include a parking location 451, a parking time 452, a distance 453 between the electronic device and the parking location, navigation information 454, and the like.

The menu bar allows users to switch between different pages to perform different operations.

With reference to the user interface 400 in FIG. 5B, for example, the first message received by the ECU 1 in S100 may be:

(1) After the electronic device detects a user operation (for example, a tap operation or a touch operation) on the control 431, and sends, to the server in response to the operation, a control instruction used to start or shut down the engine, the server sends, to the T-box ECU 13, the control instruction used to start or shut down the engine. Herein, the T-box ECU 13 is the ECU 1, the engine ECU 12 is the ECU 2, and the first function is to start or shut down the engine.

(2) After the electronic device detects the user operation (for example, the tap operation or the touch operation) on the control 432, and sends, to the server in response to the operation, the control instruction used to open/close the vehicle window, the server sends, to the T-box ECU 13, the control instruction used to open/close the vehicle window. Herein, the T-box ECU 13 is the ECU 1, a body control module (body control module, BCM) is the ECU 2, and the first function is opening/closing the vehicle window.

(3) After the electronic device detects the user operation (for example, the tap operation or the touch operation) on the control 433, and sends, to the server in response to the operation, the control instruction used to open/close the vehicle door, the server sends, to the T-box ECU 13, the control instruction used to open/close the vehicle door. Herein, the T-box ECU 13 is the ECU 1, the BCM is the ECU 2, and the first function is to open/close the vehicle door.

S101: The ECU 1 sends a packet a to the ECU 2, where the packet a includes a digital certificate 1 of the ECU 1 and a random number r1.

Specifically, in this embodiment of this application, all packets transmitted during communication between the ECU 1 and the ECU 2 are transmitted by using a CAN bus 11.

In this embodiment of this application, each packet transmitted during communication between the ECU 1 and the ECU 2 includes an identifier of a sender and an identifier of a receiver. Because all ECUs on the CAN bus 11 can receive the packet transmitted on the CAN bus 11, after receiving the packet, the ECUs may learn the sender of the packet through the identifier of the sender, and learn the receiver of the packet through the identifier of the receiver. For example, the packet a may include an identifier 1 of the ECU 1 and an identifier 2 of the ECU 2. The identifier 1 or the identifier 2 may be a combination of a string of digits, letters, and symbols, for example, may be a sequence number, a number, or a name.

For brevity of description, the identifier of the sender and the identifier of the receiver that are carried in the packet will not be explained in subsequent embodiments.

In the packet a, for a process of issuing the digital certificate 1, refer to the foregoing descriptions of FIG. 2 and FIG. 3. The digital certificate 1 includes a public key of the ECU 1 and an identifier of a CA (for example, a security domain 1 CA) that issues the digital certificate 1. In some embodiments, the digital certificate 1 may further include information such as a validity period, a serial number, or an identity of a holder of the digital certificate 1.

The random number r1 may be generated by the ECU 1, or may be an agreed digital certificate 1 or a number in the identifier 1.

S102: The ECU 2 verifies validity of the digital certificate 1.

After the ECU 1 sends the packet a, all ECUs on the CAN bus can receive the packet a.

Specifically, after receiving the packet a, the ECU 2 performs signature verification on the digital certificate 1 by using the public key of the CA that issues the digital certificate 1. If the verification succeeds, it indicates that the digital certificate 1 is valid. When verifying the digital certificate 1, the ECU 2 needs to trace back to the root certificate. For a specific manner in which the ECU 2 verifies the validity of the digital certificate 1, refer to the foregoing descriptions about the validity of the digital certificate and the certificate chain.

S103: After confirming that the digital certificate 1 is valid, the ECU 2 returns a packet b to the ECU 1. The packet b includes a digital certificate 2, a random number r2, and a signature 2. The signature 2 is a signature made by the ECU 2 on the random number r1 by using the private key 2 of the ECU 2.

For a process of issuing the digital certificate 2, refer to the foregoing descriptions of FIG. 2 and FIG. 3. The digital certificate 2 includes a public key of the ECU 2 and an identifier of a CA (for example, the security domain 1 CA) that issues the digital certificate 2. In some embodiments, the digital certificate 2 may further include information such as a validity period, a serial number, or an identity of a holder of the digital certificate 2.

The random number r2 may be generated by the ECU 2, or may be a number in the agreed digital certificate 2 or the identifier 2.

The signature 2 is a signature made by the ECU 2 on the random number r1 by using the private key 2 of the ECU 2. In other words, the private key 2 and the random number RI are processed through an algorithm.

S104: The ECU 1 verifies validity of the digital certificate 2.

Specifically, the ECU 1 may perform signature verification on the digital certificate 2 by using a public key of the CA that issues the digital certificate 2. If the verification succeeds, it indicates that the digital certificate 2 is valid.

S105: The ECU 1 verifies whether the ECU 2 is a valid holder of the digital certificate 2.

Specifically, the ECU 1 performs signature verification on the signature 2 by using a public key 2 carried in the digital certificate 2. If a signature verification result is consistent with the random number r1 in S101, it indicates that the public key 2 carried in the digital certificate 2 and the private key 2 are a pair of keys. That is, the ECU 2 is a valid holder of the digital certificate 2.

S106: After determining that the digital certificate 2 is valid and the ECU 2 is the valid holder of the digital certificate 2, the ECU 1 sends a packet c to the ECU 2, where the packet c includes a signature 1 of the ECU 1.

The signature 1 may be a signature made by the ECU 1 on the random number r2 by using the private key 1 of the ECU 1, or may be a signature made on both the random number r1 and the random number r2.

It may be understood that the ECU 1 performs S106, that is, a result of verification performed by the ECU 1 on the ECU 2 is that the digital certificate 2 is valid and the ECU 2 is the valid holder of the digital certificate 2.

S107: The ECU 2 verifies whether the ECU 1 is a valid holder of the digital certificate 1.

For a process in which the ECU 2 verifies whether the ECU 1 is the valid holder of the digital certificate 1, refer to step S105.

Specifically, the ECU 2 performs signature verification on the signature 1 by using the public key 1 carried in the digital certificate 1. If a signature verification result is consistent with the random number r2 in S103, or a signature verification result is consistent with the random numbers r2 and r1, it indicates that the public key 1 and the private key 1 carried in the digital certificate 1 are a pair of keys, that is, the ECU 1 is the valid holder of the digital certificate 1.

S108: The ECU 2 sends a packet d to the ECU 1. The packet d includes a result of authenticating the ECU 1 by the ECU 2.

The identifier 2 of the ECU 2 in the packet d is used to indicate that a sender of the packet d is the ECU 2, and the identifier 1 of the ECU 1 is used to indicate that the packet d is sent to the ECU 1.

Herein, there may be two results of security authentication performed by the ECU 2 on the ECU 1: The digital certificate 1 is valid and the ECU 1 is the valid holder of the digital certificate 1, and the digital certificate 1 is valid but the ECU 1 is not the valid holder of the digital certificate 1.

The first verification result indicates that the verification succeeds, and other verification results indicate that the verification fails.

According to the foregoing steps S100 to S108, if the result of verification performed by the ECU 2 on the ECU 1 is that the digital certificate 1 is valid and the ECU 1 is the valid holder of the digital certificate 1, a bidirectional authentication process is completed between the ECU 1 and the ECU 2. If the bidirectional authentication fails, the ECU 1 and the ECU 2 will not communicate with each other.

In some other embodiments, the foregoing steps S100 to S108 may be replaced with.

The ECU 1 sends the digital certificate 1, the random number r1, and the signature made on the random number r1 by using the private key 1 to the ECU 2.

The ECU 2 verifies validity of the digital certificate 1, and verifies whether the ECU 1 is the valid holder of the digital certificate 1.

After it is determined that the digital certificate 1 is valid and the ECU 1 is the valid holder of the digital certificate 1, the ECU 2 sends, to the ECU 1, the digital certificate 2, the random number r2, and the signature made on the random number r2 by using the private key 2.

The ECU 1 verifies validity of the digital certificate 2, and verifies whether the ECU 2 is the valid holder of the digital certificate 2.

The ECU 1 sends the result of authenticating the ECE to the ECU 2.

Herein, there may be four results of security authentication performed by the ECU 1 on the ECU 2: The digital certificate 2 is valid and the ECU 2 is the valid holder of the digital certificate 2, the digital certificate 2 is valid but the ECU 2 is not the valid holder of the digital certificate 2, the digital certificate 2 is invalid and the ECU 2 is not the valid holder of the digital certificate 2, and the ECU 2 is the valid holder of the digital certificate 2 but the digital certificate 2 is invalid.

By using the foregoing replacement steps, a bidirectional authentication process between the ECU 1 and the ECU 2 can be simplified, interaction processes between the ECU 1 and the ECU 2 can be reduced, and resources can be saved.

In this embodiment of this application, bidirectional authentication between the ECU 1 and the ECU 2 succeeds. In other words, authenticity of identity information of the ECU 1 and the ECU 2 can be ensured, and further communication may be performed between the ECU 1 and the ECU 2. Refer to the following steps S109 to 112.

It may be understood that an execution sequence of S101 to S108 is not limited in this embodiment of this application, provided that the ECU 1 completes security authentication on the ECU before indicating the ECU 2 to start the first function, and the ECU 2 completes security authentication on the ECU 1 before starting or rejecting the first function according to the indication.

It may be understood that, after S101 to S108 are performed once between the ECU 1 and the ECU 2, a result of security authentication performed on each other may be recorded. In this way, in a subsequent interaction process between the ECU 1 and the ECU 2, the bidirectional authentication process shown in S101 to S108 does not need to be performed again.

This is not limited to that the bidirectional authentication process is triggered between the ECU 1 shown in FIG. 4A and FIG. 4B and the ECU 2 when the ECU 1 receives the first message. In another embodiment, the ECU 1 and the ECU 2 may alternatively periodically perform the bidirectional authentication process. This is not limited in this embodiment of this application.

S109-S112. The ECU 1 indicates the ECU 2 to start the first function.

S109: The ECU 1 sends a packet e to the ECU 2. The packet e includes a first instruction encrypted by using the private 108 key 1, and the first instruction is used to instruct the ECU 2 to start the first function.

In some embodiments, the ECU 1 may first perform calculation on the first instruction by using a hash (hash) algorithm, and then encrypt the first instruction by using the private key 1. The hash algorithm can compress a size of the first instruction, so as to improve communication efficiency.

A sequence of S109 and S100 to S108 is not limited in this embodiment of this application.

S110: After receiving the packet e, the ECU 2 decrypts the packet e by using the public key 1 carried in the digital certificate 1, to obtain the first instruction.

S111: The ECU 2 determines, based on a degree of matching between certificate chains of the two parties, a function that is currently allowed to be accessed by the ECU 2.

Each ECU may prestore a certificate chain of the ECU, or may query a network for a certificate chain of the ECU. This is not limited in this embodiment of this application. That is, the ECU 2 may obtain its own certificate chain locally, or may query its own certificate chain from the network.

The ECU 2 may further obtain the certificate chain of the ECU 1 from the ECU 1, or query the certificate chain of the ECU 2 from the network. In some embodiments, the certificate chain of the ECU 1 may be carried in any packet sent by the ECU 1 to the ECU 2 in S101, S106, and S109, for example, the packet a, the packet c, or the packet e. In some embodiments, after obtaining the certificate chain of the ECU 1, the ECU 2 may store the certificate chain of the ECU 1.

The matching degree of the certificate chains of the two parties specifically refers to a quantity of same CAs (including the root CA and the intermediary CA) included in the certificate chains of the two parties. A larger quantity of same CAs contained in the certificate chains of the two parties indicates a higher matching degree.

Figure 6:
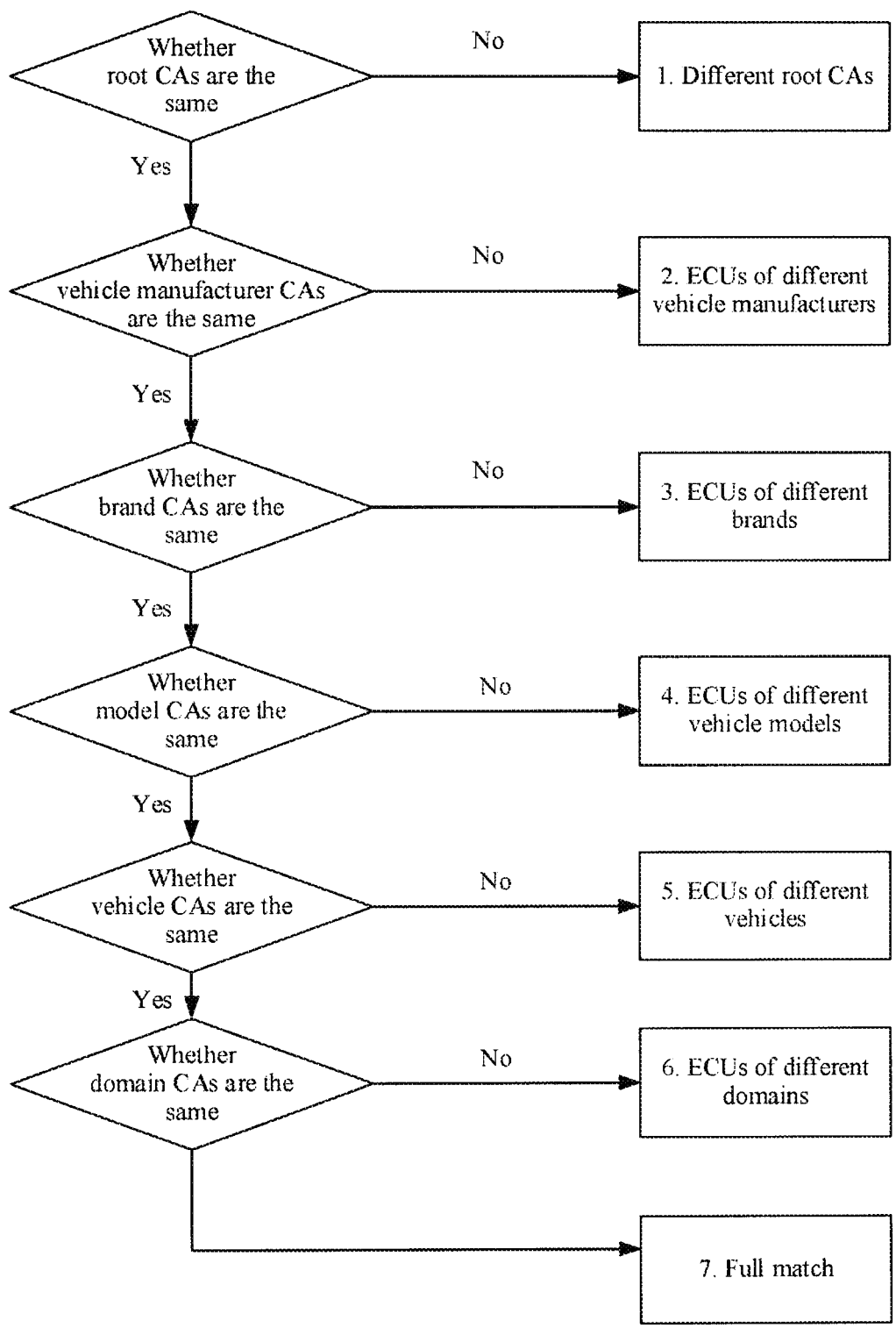
FIG. 6 is a flowchart of determining a matching degree of certificate chains according to an embodiment of this application.

Refer to FIG. 6. FIG. 6 outputs an example of a procedure in which the ECU 2 determines a degree of matching between certificate chains of the two parties. As shown in the figure, ECU 2 starts from the root CA and determines whether the CAs of the two parties are the same layer by layer to obtain a matching degree. A result of the matching degree may include, for example:

1. The root CAs of the two parties are different. In other words, the digital certificates 1 and 2 are issued by different root CAs.

2. The root CAs of the two parties are the same, but the automotive manufacturer CAs are different. In other words, the digital certificates 1 and 2 are issued by the same CA but different automotive manufacturer CAs. In other words, the ECU 1 and the ECU 2 belong to different automotive manufacturers.

3. The root CAs and automotive manufacturer CAs of the two parties are the same, but the brand CAs are different. In other words, the ECU 1 and the ECU 2 belong to different brands.

4. The root CAs, automotive manufacturer CAs. and brands CA of the two parties are the same, but the model CAs are different. In other words, the ECU 1 and the ECU 2 belong to different models.

5. The root CAs, automotive manufacturer CAs, brand CAs, and model CAs of the two parties are the same, but the vehicle CAs are different. In other words, the ECU 1 and the ECU 2 belong to different vehicles.

6. The root CAs, automotive manufacturer CAs, brand CAs, model CAs, and vehicle CAs of the two parties are the same, but the domain CAs are different. In other words, the ECU 1 and the ECU 2 belong to different domains.

7. The root CAs, automotive manufacturer CAs, brand CAs, model CAs, vehicle CAs, and domain CAs of the two parties are the same. In other words, the ECU 1 and the ECU 2 belong to the same domain, and the ECU 1 and the ECU 2 are completely matched.

In this embodiment of this application, a higher degree of matching between the certificate chains of the two parties indicates a larger quantity of functions that are allowed to be accessed by the ECU 2. A function that is allowed to be accessed by the ECU 2 is a function that can be currently opened or a function that is authorized to be used in functions provided by the ECU 2.

Refer to Table 1 and Table 2. Table 1 uses an example in which the ECU 2 is an engine ECU, and shows an example of a function that is allowed to be accessed by the engine ECU when matching degrees of the two parties are different. Table 2 uses an example in which the ECU 2 is a T-box ECU, to show an example of a function that is allowed to be accessed by the T-box ECU when matching degrees of the two parties are different.

TABLE 1

| Number | Matching result | Function that is allowed to be accessed by the ECU 2 (the engine ECU) |
|---|---|---|
| 1 | Different root CAs | None |
| 2 | Different automotive manufacturers | None |
| 3 | Different brands | None |
| 4 | Different models | Open and close |
| 5 | Different vehicles | Open and close |
| 6 | Different domains | Open and close |
| 7 | Same domain | Open and close |

TABLE 2

| Number | Result of a matching degree | Function that is allowed to be accessed by the ECU 2 (T-box ECU) |
|---|---|---|
| 1 | Different root CAs | None |
| 2 | Different automotive manufacturers | None |
| 3 | Different brands | None |
| 4 | Different models | Function of network communication with the server |
| 5 | Different vehicles | Function of network communication with the server |
| 6 | Different domains | Function of network communication with the server |
| 7 | Same domain | Function of network communication with the server, and a function of controlling other ECUs based on a remote instruction. |

In some embodiments, when matching degrees of the two parties are different, restricted functions of the ECU may be classified into two types: a function independently completed by the ECU (for example, a start function or a shut-down function of the engine ECU), and a function completed by the ECU through interaction with another device (for example, a function of controlling another ECU by the T-box ECU based on the remote instruction).

In some embodiments, before performing S109, the ECU 1 may alternatively determine, based on a matching degree of certificate chains of the two parties, a function that is allowed to be accessed by the ECU 1, and perform S109 only when this item "indicating the ECU 2 to start the first function" is the function that is currently allowed to be accessed by the ECU 1.

S112: If the functions that are currently allowed to be accessed by the ECU 2 include the first function indicated by the first instruction, the ECU 2 starts the first function, or if the functions that are currently allowed to be accessed by the ECU 2 do not include the first function indicated by the first instruction, the ECU 2 refuses to start the first function.

For example, if the ECU 2 is the engine ECU, the first function is to start the engine, and certificate chains of the ECU 1 and the ECU 2 completely match, the ECU 2 (that is, the engine ECU) starts the engine.

Optional step S113: The ECU 2 encrypts a packet f by using the private key 2, and sends the packet f to the ECU 1. The packet f includes the execution result of the first function.

The execution result of the first function may be success or failure.

Through S113, the ECU 2 may decrypt the packet f by using the public key 2, to learn of the execution result the first function by the ECU 1.

Optional step S114: The ECU 1 sends a second message to the electronic device, where the second message is used to indicate the execution result of the first function.

Specifically, the ECU 1 may send a remote instruction to the server, where the remote instruction carries the execution result of the first function. Then, the server sends the remote instruction to the electronic device, and the remote instruction received by the electronic device is the second message.

In some embodiments, when the ECU 2 fails to start the first function, the second message may further carry a matching degree result of the certificate chains of the ECU 1 and the ECU 2. In this way, it may be convenient for a subsequent user to learn a reason why the ECU 2 fails to start the first function.

Optional step S115: The electronic device receives the second message, and outputs prompt information, where the prompt information is used to indicate the result of performing the first function by the ECU 1.

The prompt information output by the electronic device may include but is not limited to: a visual interface element, audio, a flash, vibration, or the like displayed on a user interface.

Figure 7A:
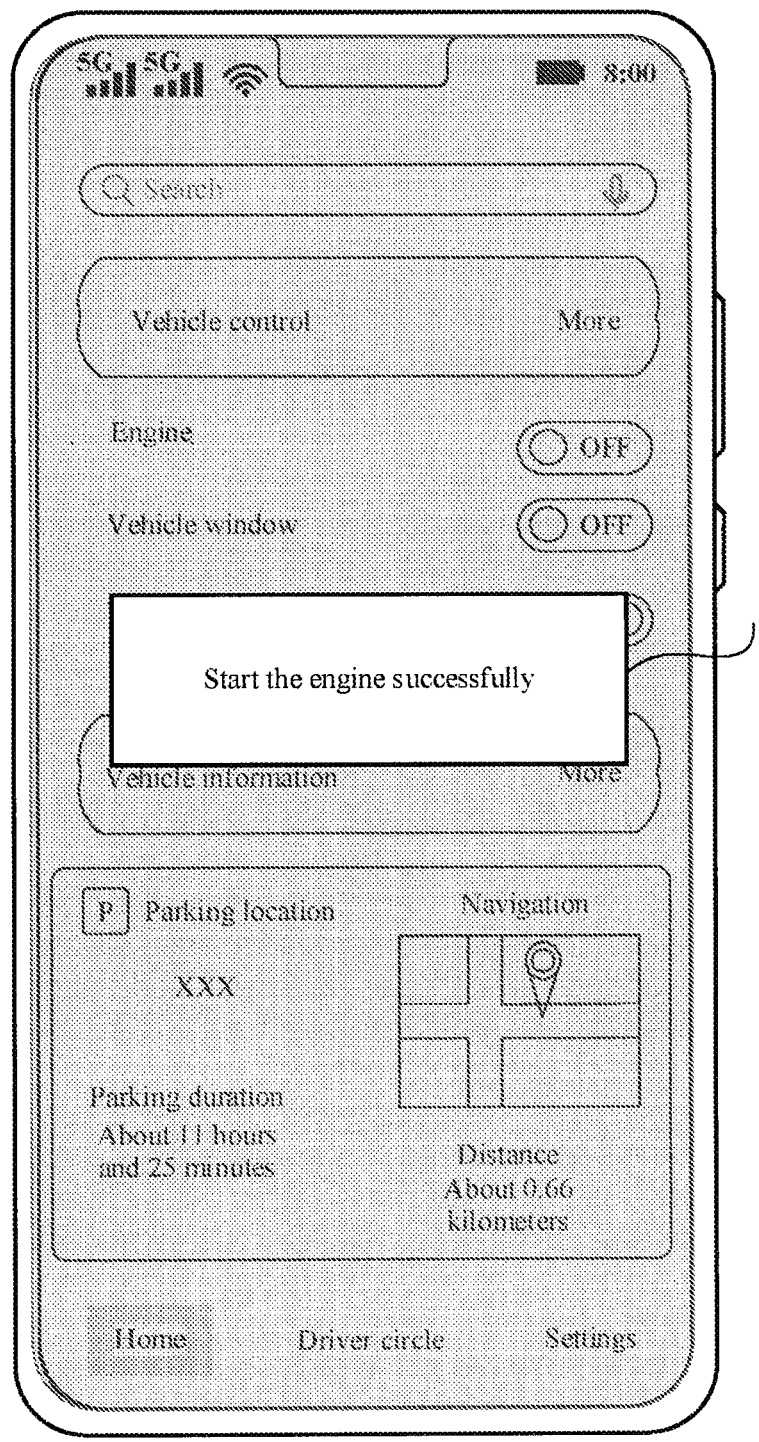
FIG. 7A to FIG. 7C show a group of user interfaces implemented on an electronic device according to an embodiment of this application.
Figure 7B:
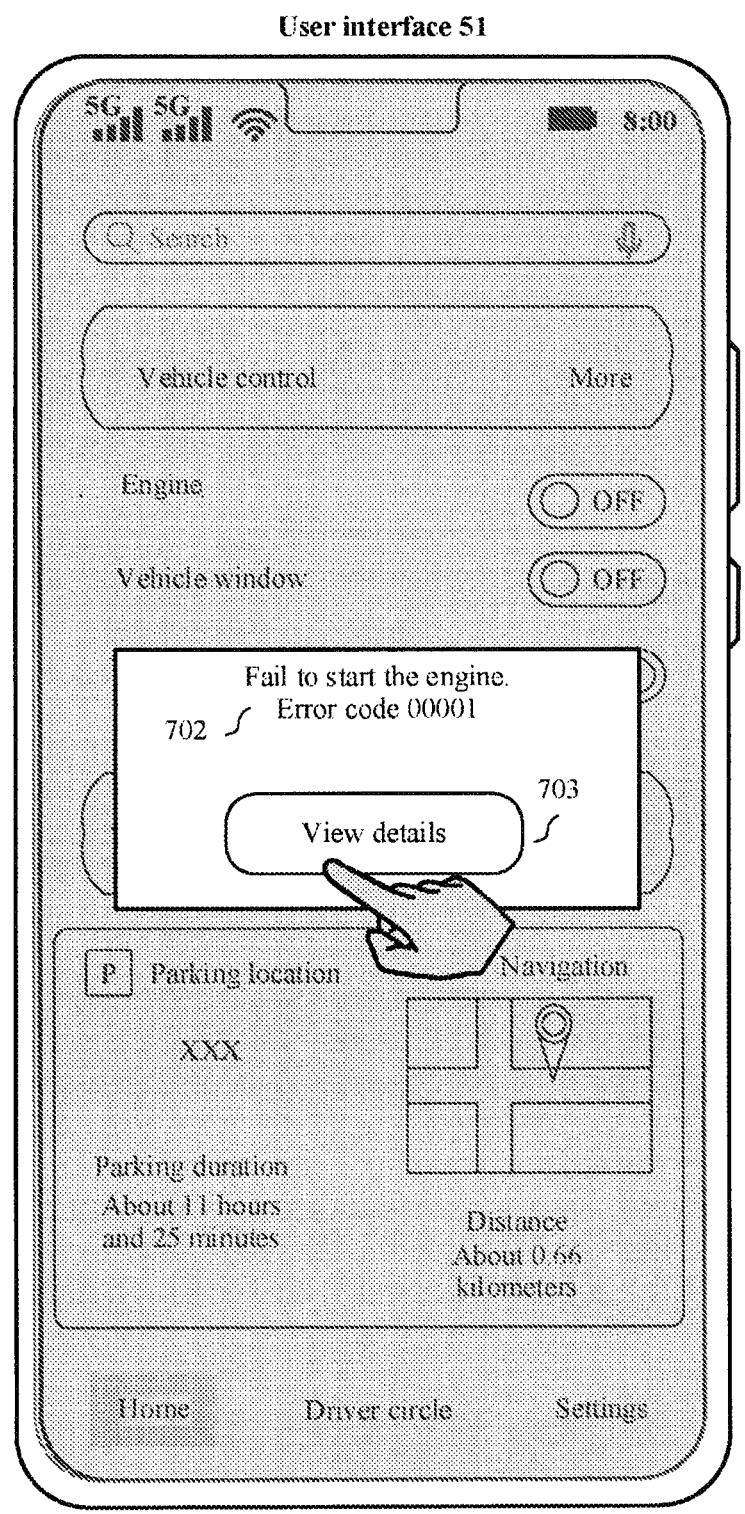
Figure 7C:
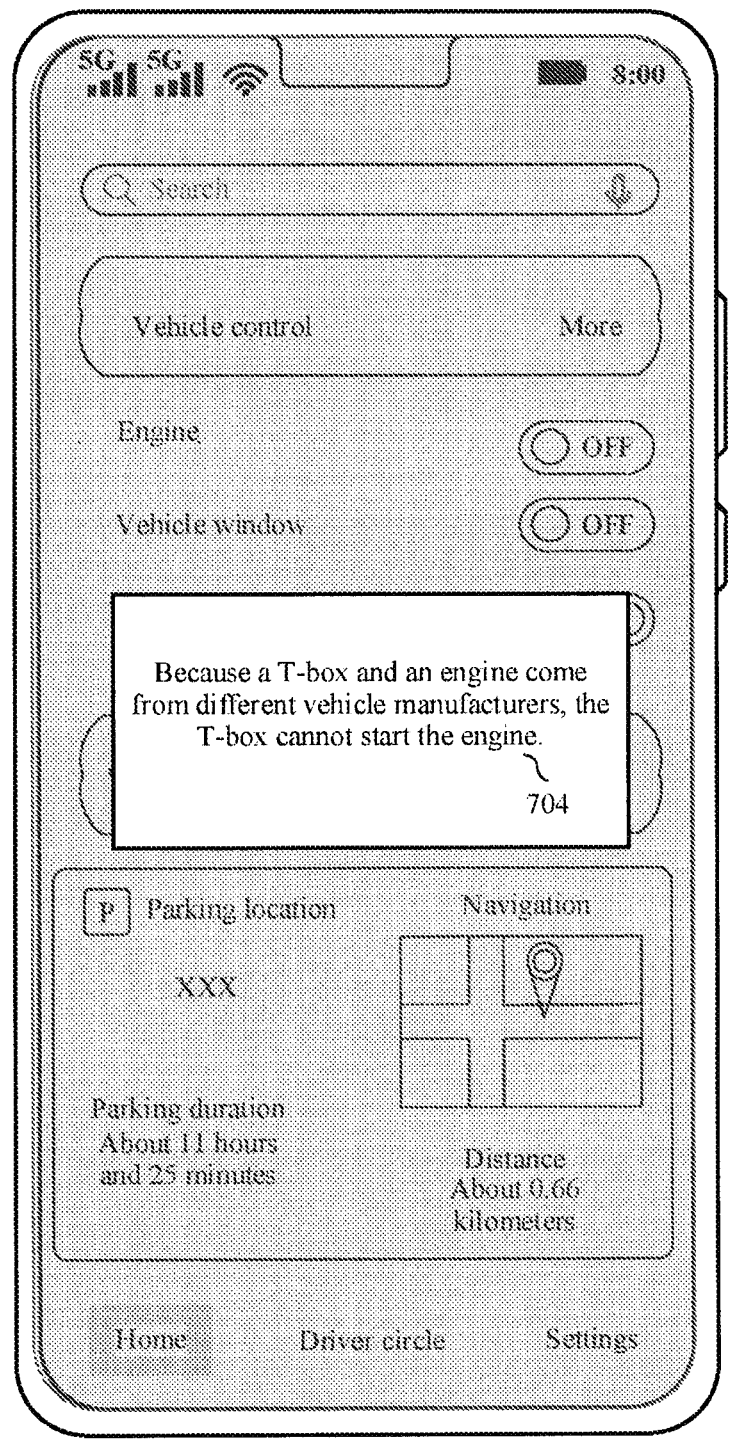

Refer to FIG. 7A to FIG. 7C. FIG. 7A to FIG. 7C show examples of prompt information displayed by an electronic device on the user interface 400.

As shown in FIG. 7A, when the ECU 1 successfully starts the first function, the user interface 400 may display prompt information 701. The prompt information 701 may be, for example, a text (for example, "Start the engine successfully"), an icon, or an animation.

As shown in FIG. 7B, when the ECU 1 fails to start the first function, the user interface 400 may display prompt information 702. The prompt information 702 may be, for example, a text (for example, "Failed to start the engine. Error code 00001"), an icon, an animation, or the like. In this way, the user may learn, by querying a code explanation in a vehicle specification, the reason why the ECU 1 fails to start the first function. In some other embodiments, the user interface 400 may further display a control 703. The control 703 may be configured to listen to a user operation. In response to the user operation, the electronic device may display a cause of a startup failure, for example, display a matching result 704 of certificate chains of the ECU 1 and the ECU 2 shown in FIG. 7C.

Optional step S116: The vehicle system outputs prompt information, where the prompt information is used to indicate the result of performing the first function by the ECU 1.

A sequence of S116, S114, and S115 is not limited in this embodiment of this application.

Specifically, after learning the result of performing the first function by the ECU 2, the ECU 1 may notify a related device in the vehicle system of the execution result, so that the related device outputs prompt information. The prompt information output by the vehicle system may include but is not limited to: a visual interface element displayed on the display, audio output by an audio device, light output by a lamp, data output by a dashboard, and the like.

Figure 8A:
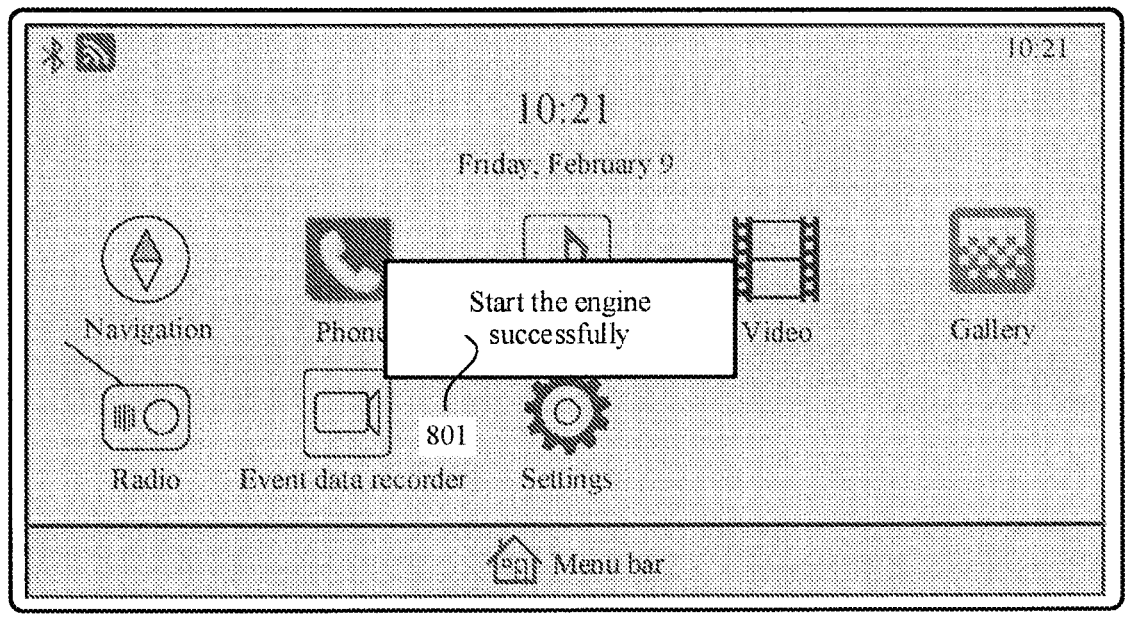
FIG. 8A to FIG. 8C show a group of user interfaces implemented on a vehicle system according to an embodiment of this application.
Figure 8B:
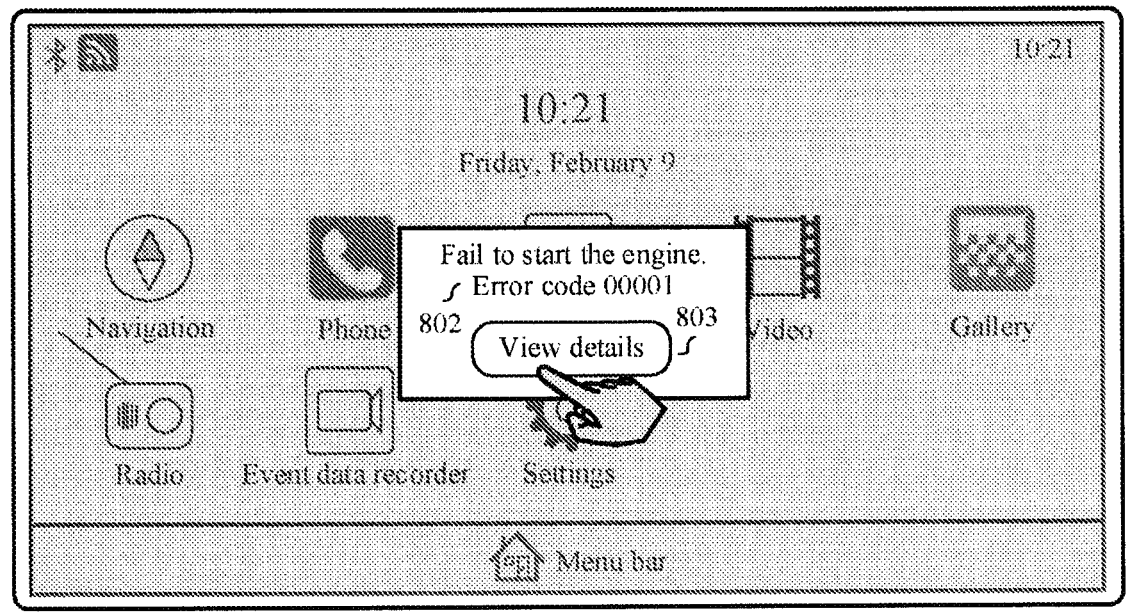
Figure 8C:
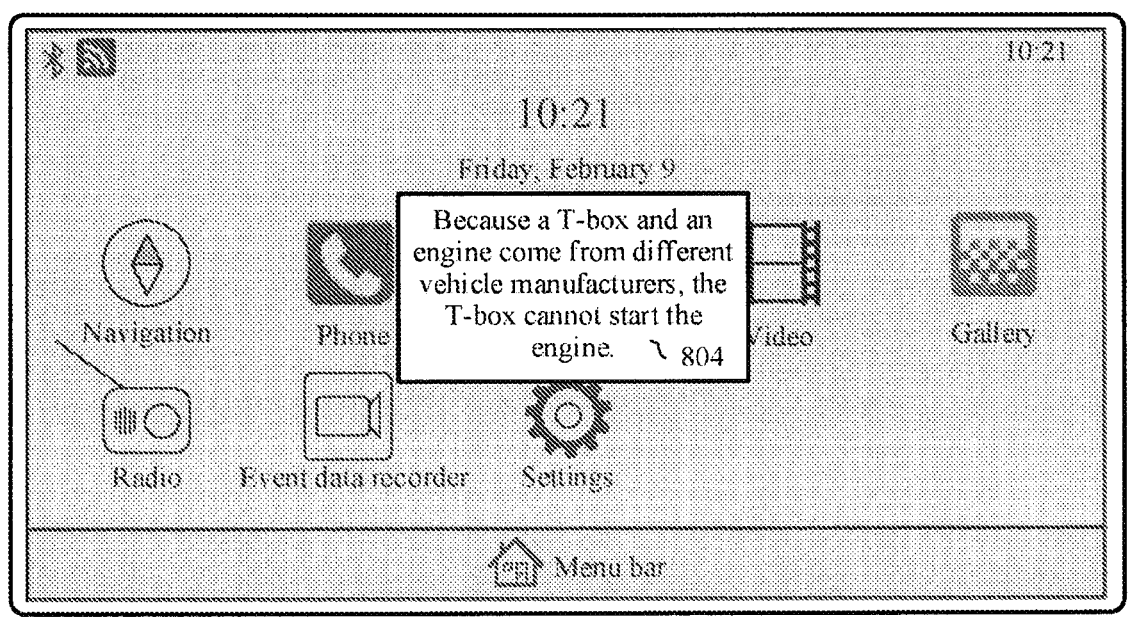

Refer to FIG. 8A to FIG. 8C. FIG. 8A to FIG. 8C shows an example of a user interface 500 displayed by a vehicle system on a display (for example, a display provided by a navigation device).

As shown in FIG. 8A, when the ECU 1 successfully starts a first function, the user interface 500 may display prompt information 801. The prompt information 801 may be, for example, a text (for example, "Start the engine successfully"), an icon, or an animation.

As shown in FIG. 8B, when the ECU 1 fails to start the first function, the user interface 500 may display prompt information 802. The prompt information 802 may be, for example, a text (for example, "Failed to start the engine. Error code 00001"), an icon, an animation, or the like. In this way, the user may learn, by querying a code explanation in a vehicle specification, the reason why the ECU 1 fails to start the first function. In some other embodiments, the user interface 500 may further display a control 803. The control 803 may be configured to listen to a user operation. In response to the user operation, the electronic device may display a cause of a startup failure, for example, display a matching result 804 of certificate chains of the ECU 1 and the ECU 2 shown in FIG. 8C.

This is not limited to that before the ECU 1 provided in the foregoing embodiment of this application indicates the ECU 2 to start the first function, both parties perform security authentication. In some other embodiments, before starting a function of the master ECU, the master ECU may also perform security authentication on another key ECU, and determine, based on a matching degree of certificate chains between the master ECU and the another key ECU, whether to start the function.

For example, the main ECU may be an engine ECU, and the key ECU may include a T-box ECU. When the vehicle system receives an operation of starting the engine (for example, an operation of ignition by the user), the engine ECU may initiate security authentication on the T-box. For example, the engine ECU may send a random number to the T-box ECU, and then the T-box replies with a digital certificate of the T-box and a signature made on the random number by using a private key of the T-box, so that the engine ECU can perform security authentication on the T-box ECU. After the security authentication performed by the engine ECU on the T-box ECU succeeds, the engine ECU may determine, based on a matching degree of certificate chains of the engine ECU and the T-box ECU, whether to start the engine.

In this way, when the master ECU is working, it can be verified whether the key ECU is tampered with or stolen, and driving safety can be ensured.

In this embodiment of this application, the ECU 1 may be referred to as a first ECU, and the ECU 2 may be referred to as a second ECU.

The digital certificate 1 may be referred to as a first digital certificate, and the digital certificate 2 may be referred to as a second digital certificate.

The public key 1 may be referred to as a first public key, and the public key 2 may be referred to as a second public key.

The private key 1 may be referred to as a first private key, and the private key 2 may be referred to as a second private key.

Each CA that issues the digital certificate 1 may be referred to as a first CA, and each CA that issues the digital certificate 2 may be referred to as a second CA.

According to the vehicle-mounted device control method provided in this embodiment of this application, secure communication between the ECUs is implemented by using a digital certificate, so that a security level of the vehicle system can be improved. In addition, the method does not need to distinguish between a main ECU and a key ECU. This reduces a requirement for storage space. In addition, certificate chain matching degrees are different in a security method between the ECUs, and functions that can be accessed by an ECU 2 are different. According to this method, ECU resource waste caused by unity of an authentication result in the conventional technology is avoided, costs and resources are saved, and user experience is improved. In addition, after an ECU in the vehicle system is replaced into another vehicle system, the ECU may further restrict some functions and continue to run. In this way, the ECU can be appropriately reused, costs and resources can be saved, and user experience can be improved.

For example, devices may be exchanged between vehicles of a same model. In this way, if a user needs to replace a vehicle-mounted device, the user does not necessarily need to return the vehicle-mounted device to the factory for replacement or repair. This provides convenience for the user to the manufacturer. For another example, a vehicle is scrapped, but a vehicle owner may replace an available vehicle-mounted device in the scrapped vehicle with another vehicle. This saves costs and resources.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to this application are all or partially generated. The computer may be a general-purpose computer, a dedicated computer, a computer network, or other programmable apparatuses. The computer instructions may be stored in a computer-readable storage medium, or transmitted from one computer-readable storage medium to another computer-readable storage medium.

A person of ordinary skill in the art may understand that all or some of the processes of the methods in embodiments may be implemented by a computer program instructing related hardware. The program may be stored in a computer-readable storage medium. When the program runs, the processes of the methods in embodiments are performed. The foregoing storage medium includes any medium that can store program code, such as a ROM, a random access memory RAM, a magnetic disk, or an optical disc.

In conclusion, the foregoing descriptions are merely embodiments of the technical solutions of the present invention, but are not intended to limit the protection scope of the present invention. Any modification, equivalent replacement, or improvement nude according to the disclosure of the present invention shall fall within the protection scope of the present invention.

What is claimed is:

1. A method applied to a vehicle system, wherein the method comprises:
    sending, by a first electronic control unit (ECU) of the vehicle system, a first digital certificate to a second ECU of the vehicle system, wherein the first digital certificate comprises a first public key;
    sending, by the first ECU to the second ECU, an encrypted first instruction encrypted with a first private key, wherein the encrypted first instruction instructs the second ECU to start a first function;
    decrypting, by the second ECU, the encrypted first instruction using the first public key;
    determining, by the second ECU based on a quantity of same certificate authorities (CAs) comprised in a first certificate authority (CA) and a second CA, whether the first function is accessible by the second ECU, wherein a larger quantity of same CAs comprised in the first CA and the second CA indicates a larger quantity of functions that are accessible by the second ECU;
    starting, by the second ECU, the first function when the first function is accessible by the second ECU; and
    failing, by the second ECU, to start the first function when the first function is not accessible by the second ECU.

2. The method of claim 1, wherein before sending the first digital certificate to the second ECU, the method further comprises receiving, by the first ECU, a first message from an electronic device, wherein the first message instructs the second ECU to start the first function.

3. The method of claim 2, wherein when starting the first function, the method further comprises:
    sending, by the second ECU, a result of starting the first function to the first ECU; and
    sending, by the first ECU, a second message to the electronic device, wherein the second message indicates the result of starting the first function by the second ECU.

4. The method of claim 1, wherein when starting the first function, the method further comprises displaying, by a display of the vehicle system, prompt information indicating a result of starting the first function.

5. The method of claim 1, wherein the first CA comprises at least one of: a root CA, an automotive manufacturer CA, a brand CA, a model CA, a vehicle CA, or a domain CA.

6. The method of claim 1, wherein the second CA comprises at least one of: a root CA, an automotive manufacturer CA, a brand CA, a model CA, a vehicle CA, or a domain CA.

7. The method of claim 1, wherein the first ECU is an ECU of a vehicle-mounted telematics box, and wherein the second ECU is an ECU of an engine.

8. The method of claim 1, wherein the second ECU is an ECU of a vehicle-mounted telematics box.

9. The method of claim 1, wherein before sending the encrypted first instruction, the method further comprises determining, by the first ECU based on the quantity of same CAs comprised in the first CA and the second CA, a function that is accessible by the first ECU, wherein the larger quantity of same CAs comprised in the first CA and the second CA indicates a larger quantity of functions that are allowed to be accessed by the first ECU, and wherein sending the encrypted first instruction encrypted with the first private key comprises sending, by the first ECU to the second ECU, instructions to start the first function.

10. The method of claim 1, further comprising:
    storing, by the first ECU, a first certificate chain comprising a digital certificate of the first CA; and
    storing, by the second ECU, a second certificate chain comprising a digital certificate of the second CA,
    wherein before determining whether the first function is accessible by the second ECU, the method further comprises:
        sending, by the first ECU, the first certificate chain to the second ECU; and
        determining, by the second ECU based on the first certificate chain and the second certificate chain, the quantity of same CAs comprised in the first CA and the second CA.

11. The method of claim 1, wherein before sending the encrypted first instruction, the method further comprises determining, by the first ECU, that a second digital certificate is valid and the second ECU is a valid holder of the second digital certificate.

12. The method of claim 1, wherein before decrypting the encrypted first instruction with the first public key, the method further comprises determining, by the second ECU, that the first digital certificate is valid and the first ECU is a valid holder of the first digital certificate.

13. The method of claim 12, wherein determining that the first digital certificate is valid further comprises determining, by the second ECU, that the first digital certificate is issued by a trusted CA.

14. The method of claim 12, wherein determining that the first digital certificate is valid further comprises determining, by the second ECU, that the first digital certificate is issued by a trusted CA and is within a validity period.

15. The method of claim 12, wherein determining that the first ECU is a valid holder of the first digital certificate comprises determining, by the second ECU, that the first private key and the first public key are a key pair.

16. The method of claim 15, wherein before determining that the first private key and the first public key are the key pair, the method further comprises:
    processing, by the first ECU, a random number using the first private key to obtain a first signature;

sending, by the first ECU, the first signature to the second ECU; and verifying, by the second ECU, the first signature using the first public key, wherein when a verification result is the same as the random number, the first private key and the first public key are the key pair.

17. A vehicle-mounted device control method applied to a second electronic control unit (ECU), wherein the vehicle-mounted device control method comprises:

receiving, by the second ECU, a first digital certificate from a first ECU storing the first digital certificate and a first private key, wherein the first digital certificate comprises a first public key;

receiving, by the second ECU, a first instruction from the first ECU, wherein the first instruction is encrypted with the first private key, wherein the first instruction instructs the second ECU to start a first function;

decrypting, by the second ECU, the encrypted first instruction with the first public key;

determining, by the second ECU based on a quantity of same certificate authorities (CAs) comprised in a first certificate authority (CA) and a second CA, whether the first function accessible by the second ECU, wherein the first CA issues the first digital certificate, wherein the second CA issues a second digital certificate stored by the second ECU, wherein a larger quantity of same CAs comprised in the first CA and the second CA indicates a larger quantity of functions that are accessible by the second ECU;

starting, by the second ECU, the first function when the first function is accessible by the second ECU; and failing, by the second ECU, to start the first function when the first function is not accessible by the second ECU.

18. The vehicle-mounted device control method of claim 17, wherein when starting the first function, the vehicle-mounted device control method further comprises sending, by the second ECU, a result of starting the first function to the first ECU.

19. The vehicle-mounted device control method of claim 17, wherein when starting the first function, the vehicle-mounted device control method further comprises sending, by the second ECU, a result of starting the first function to a display in a vehicle-mounted system in order for the display to display prompt information indicating the result of starting the first function.

20. A second electronic control unit (ECU) comprising:

a security chip configured to store a second digital certificate;

a memory configured to store computer instructions;

a processor coupled to the security chip and the memory, wherein the processor is configured to execute the computer instructions and cause the second ECU to:

receive a first digital certificate from a first ECU storing the first digital certificate and a first private key, wherein the first digital certificate comprises a first public key;

receive a first instruction from the first ECU, wherein the first instruction is encrypted with the first private key, and wherein the first instruction instructs the second ECU to start a first function;

decrypt the encrypted first instruction with the first public key;

determine, based on a quantity of same certificate authorities (CAs) comprised in a first certificate authority (CA) and a second CA, whether the first function is accessible by the second ECU, wherein the first CA issues the first digital certificate, wherein the second CA issues the second digital certificate stored by the security chip, wherein a larger quantity of same CAs comprised in the first CA and the second CA indicates a larger quantity of functions that are accessible by the second ECU;

start the first function when the first function is accessible by the second ECU; and fail to start the first function when the first function is not accessible by the second ECU.

* * * * *